United States Patent
Venkatachary et al.

(10) Patent No.: US 7,676,444 B1
(45) Date of Patent: Mar. 9, 2010

(54) ITERATIVE COMPARE OPERATIONS USING NEXT SUCCESS SIZE BITMAP

(75) Inventors: Srinivasan Venkatachary, Sunnyvale, CA (US); Pankaj Gupta, Palo Alto, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 373 days.

(21) Appl. No.: 11/689,446

(22) Filed: Mar. 21, 2007

Related U.S. Application Data

(60) Provisional application No. 60/885,607, filed on Jan. 18, 2007.

(51) Int. Cl.
*G06F 17/00* (2006.01)

(52) U.S. Cl. .................... 706/48; 711/108; 712/16

(58) Field of Classification Search ............... 707/6
See application file for complete search history.

(56) References Cited

U.S. PATENT DOCUMENTS

| | | |
|---|---|---|
| 5,051,886 A | 9/1991 | Kawaguchi et al. |
| 5,151,697 A | 9/1992 | Bunton |
| 5,278,981 A | 1/1994 | Kawaguchi et al. |
| 5,299,206 A | 3/1994 | Beaverson et al. |
| 5,386,413 A | 1/1995 | McAuley et al. |
| 5,414,704 A | 5/1995 | Spinney |
| 5,440,715 A | 8/1995 | Wyland |
| 5,440,753 A | 8/1995 | Hou et al. |
| 5,452,451 A | 9/1995 | Akizawa et al. |
| 5,469,161 A | 11/1995 | Bezek |
| 5,497,488 A | 3/1996 | Akizawa et al. |
| 5,615,378 A | 3/1997 | Nishino et al. |
| 5,712,971 A | 1/1998 | Stanfill et al. |
| 5,781,431 A | 7/1998 | Duret et al. |
| 5,963,942 A | 10/1999 | Igata |
| 5,995,963 A | 11/1999 | Nanba et al. |
| 6,011,795 A | 1/2000 | Varghese et al. |
| 6,018,524 A | 1/2000 | Turner et al. |
| 6,067,574 A | 5/2000 | Tzeng |
| 6,115,716 A | 9/2000 | Tikkanen et al. |
| 6,185,524 B1 | 2/2001 | Carus et al. |
| 6,311,183 B1 | 10/2001 | Cohen |

(Continued)

FOREIGN PATENT DOCUMENTS

EP 0408188 A2 1/1991

OTHER PUBLICATIONS

Derek Pao, Efficient Packet Classification Using TCAMs, Sep. 21, 2005, Elsevier B.V.*

(Continued)

*Primary Examiner*—Neveen Abel-Jalil
*Assistant Examiner*—Isaac T Jackson
(74) *Attorney, Agent, or Firm*—Mahamedi Paradice Kreisman LLP; William L. Paradice, III

(57) ABSTRACT

A search engine for selectively perform iterative compare operations between a searchable pattern and S overlapping substrings of an input string of characters includes a memory for storing a bitmap having S next success size (NSS) bits, wherein each NSS bit indicates whether an associated substring including a corresponding unique number of the input characters is to be compared with the searchable pattern in successive compare operations, and includes a compare circuit for selectively performing the successive compare operations in response to the NSS bits.

40 Claims, 23 Drawing Sheets

U.S. PATENT DOCUMENTS

| | | | |
|---|---|---|---|
| 6,377,942 B1 | 4/2002 | Hinsley et al. | |
| 6,421,660 B1 | 7/2002 | Glaise | |
| 6,425,099 B1 | 7/2002 | Lattmann et al. | |
| 6,487,566 B1 | 11/2002 | Sundaresan | |
| 6,505,206 B1 | 1/2003 | Tikkanen et al. | |
| 6,538,911 B1 | 3/2003 | Allan et al. | |
| 6,546,391 B1 | 4/2003 | Tsuruoka | |
| 6,560,610 B1 | 5/2003 | Eatherton et al. | |
| 6,785,677 B1 | 8/2004 | Fritchman | |
| 6,856,981 B2 | 2/2005 | Wyschogrod et al. | |
| 6,980,992 B1 | 12/2005 | Hursey et al. | |
| 7,058,821 B1 | 6/2006 | Parekh et al. | |
| 7,134,143 B2 | 11/2006 | Stellenberg et al. | |
| 7,139,753 B2 | 11/2006 | Bass et al. | |
| 7,139,837 B1 | 11/2006 | Parekh et al. | |
| 7,529,746 B2 * | 5/2009 | Ichiriu et al. | 707/6 |
| 2003/0041163 A1 | 2/2003 | Rhoades et al. | |
| 2003/0048785 A1 | 3/2003 | Calvignac et al. | |
| 2003/0051043 A1 | 3/2003 | Wyschogrod et al. | |
| 2003/0065774 A1 | 4/2003 | Steiner et al. | |
| 2003/0065800 A1 | 4/2003 | Wyschogrod et al. | |
| 2004/0015498 A1 * | 1/2004 | Rabaioli | 707/9 |
| 2004/0162826 A1 * | 8/2004 | Wyschogrod et al. | 707/6 |
| 2004/0177319 A1 | 9/2004 | Horn | |
| 2004/0267732 A1 * | 12/2004 | Luk et al. | 707/3 |
| 2005/0050260 A1 * | 3/2005 | Schacham et al. | 711/100 |
| 2005/0114306 A1 | 5/2005 | Shu et al. | |
| 2006/0059196 A1 * | 3/2006 | Sato et al. | 707/104.1 |
| 2006/0259508 A1 | 11/2006 | Sikdar et al. | |
| 2007/0027867 A1 * | 2/2007 | Ichino | 707/6 |
| 2007/0055662 A1 * | 3/2007 | Edelman et al. | 707/6 |
| 2007/0130140 A1 | 6/2007 | Cytron et al. | |
| 2008/0046423 A1 * | 2/2008 | Khan Alicherry et al. | 707/6 |
| 2008/0071781 A1 | 3/2008 | Ninan et al. | |

OTHER PUBLICATIONS

Haoyu Song, Efficient Packet Classification for Network Intrusion Detection Using FPGA, Feb. 20-22, 2005.*

A Search Algorithm for Table Entries with Non-Contiguous Wildcarding, Paul F. Tsuchiya, Bellcore, 1991, pp. 1-10.

A Tree-Based Packet Routing Table for Berkeley Unix, Keith Sklower, Berkeley Technical Report, UC Berkeley, CA, USA, 1991, pp. 1-14.

Efficient String Matching: An Aid to Bibliographic Search, Aho, A. V. and Corasick, M. J., Communications of the Association of Computing Machinery (ACM) Jun. 1975, vol. 18, No. 6. pp. 333-340.

Fast Routing Table Lookup Using CAMs, Anthony J. McAuley and Paul Francis, 1993, pp. 1382-1391, IEEE.

Gigabit Rate Packet Pattern-Matching Using TCAM, Fang Yu, Randy H. Katz, and T.V. Lakshman, Proceedings of the Network Protocols, 12th IEEE International Conference on (ICNP'04), Oct. 5-8, 2004, pp. 174-183.

High Speed Pattern Matching for Network IDS/IPS, Alicherry, Muthuprasanna and Kumar, IEEE Sep. 2006, 1-4244-0596-9/06.

Memory Organization Scheme for the Implementation of Routing Tables in High Performance IP Routers, document dated Nov. 21, 2003, 6 pages.

Over 10Gbps String Matching Mechanism for Multi-stream Packet Scanning Systems, Yutaka Sugawara, Mary Inaba, and Kei Hiraki, FPL 2004, LNCS 3203, pp. 484-493, 2004, J. Becker, M. Platzner, S. Vernalde, Editors.

Putting Routing Tables in Silicon, Tong-Bi Pei and Charles Zukowski, IEEE Network Magazine, Jan. 1992, vol. 6, No. 1, pp. 42-50.

VLSI Implementation of Routing Tables: Tries and CAMs, Tong-Bi Pei and Charles Zukowski, 1991 IEEE Infocom'91, Proceedings vol. 2, pp. 515-524.

* cited by examiner

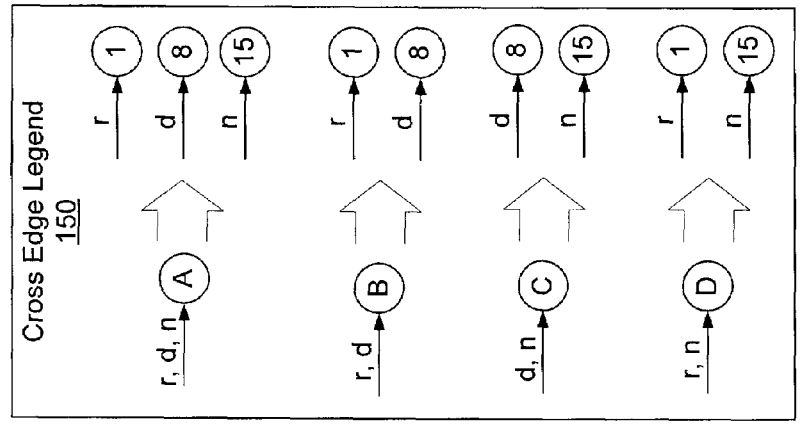
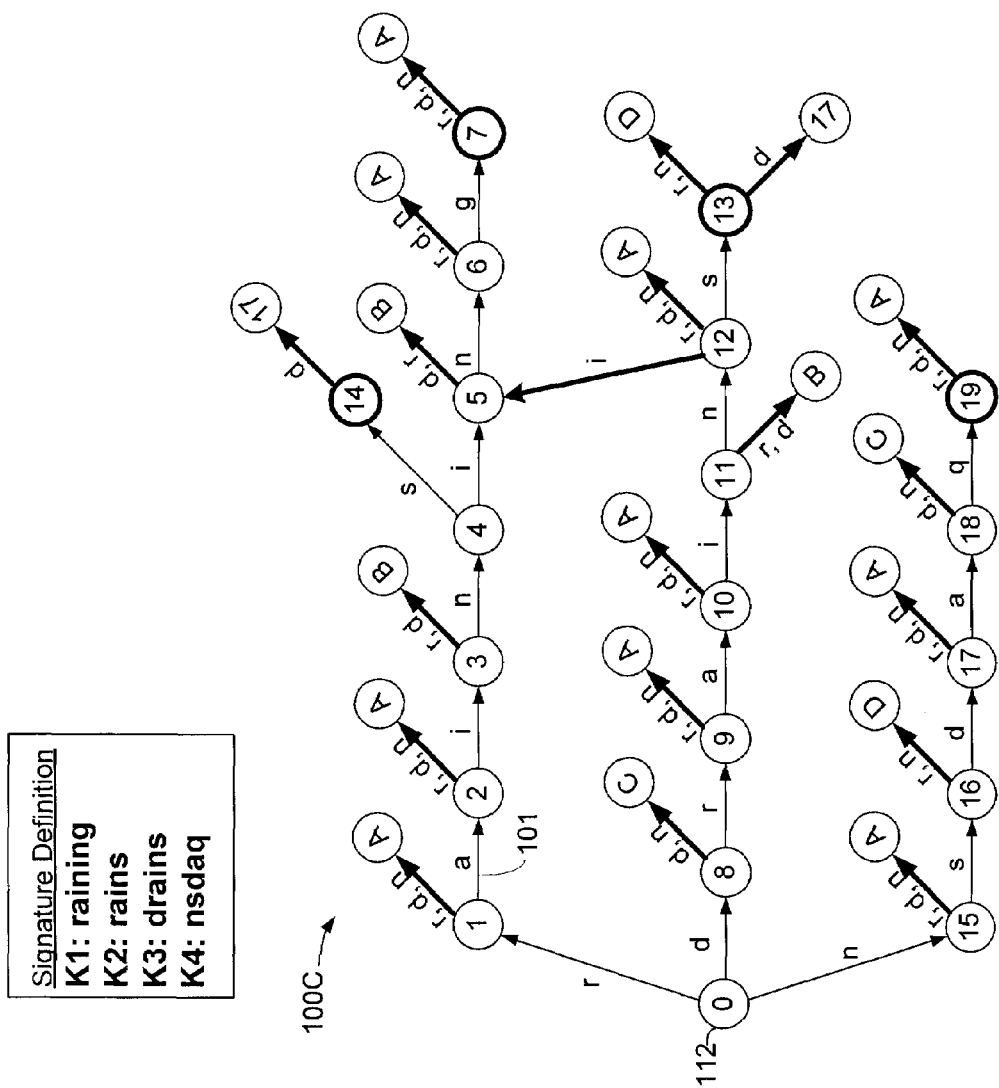
FIG. 1C (Prior Art)

| state entry | FS field | success edge field | OC field | bytes |
|---|---|---|---|---|
| S0 | 0 | r,1; d,8; n,15 | 0 | 8 |
| S1 | 0 | a,2 | 0 | 4 |
| S2 | 0 | i,3 | 0 | 4 |
| S3 | 0 | n,4 | 0 | 4 |
| S4 | 15 | i,5; s,14 | 0 | 6 |
| S5 | 0 | n,6 | 0 | 4 |
| S6 | 15 | g,7 | 0 | 4 |
| S7 | 0 | none | K1 | 3 |
| S8 | 0 | r,9 | 0 | 4 |
| S9 | 1 | a,10 | 0 | 4 |
| S10 | 2 | i,11 | 0 | 4 |
| S11 | 3 | n,12 | 0 | 4 |
| S12 | 4 | s,13 | 0 | 4 |
| S13 | 14 | none | K3 | 3 |
| S14 | 16 | none | K2 | 3 |
| S15 | 0 | s,16 | 0 | 4 |
| S16 | 0 | d,17 | 0 | 4 |
| S17 | 0 | a,18 | 0 | 4 |
| S18 | 0 | q,19 | 0 | 4 |
| S19 | 0 | none | K4 | 3 |

220 →

| State | Fail State | RPL |
|---|---|---|
| 0 | n/a | n/a |
| 1 | 0 | 1 |
| 2 | 0 | 2 |
| 3 | 0 | 3 |
| 4 | 15 | 3 |
| 5 | 0 | 5 |
| 6 | 15 | 5 |
| 7 | 0 | 7 |
| 8 | 0 | 1 |
| 9 | 1 | 1 |
| 10 | 2 | 1 |
| 11 | 3 | 1 |
| 12 | 4 | 1 |
| 13 | 14 | 1 |
| 14 | 16 | 3 |
| 15 | 0 | 1 |
| 16 | 0 | 2 |
| 17 | 0 | 3 |
| 18 | 0 | 4 |
| 19 | 0 | 5 |

| State | Old Fail State | Old RPL | New Fail State | New RPL | Action taken |
|---|---|---|---|---|---|
| 4 | 15 | 3 | 0 | 4 | change failure transition of S4 from S15 to S0 |
| 9 | 1 | 1 | 0 | 2 | change failure transition of S9 from S1 to S0 |
| 10 | 2 | 1 | 0 | 3 | change failure transition of S10 from S2 to S0 |
| 11 | 3 | 1 | 0 | 4 | change failure transition of S11 from S3 to S0 |
| 12 | 4 | 1 | 0 | 5 | add S12→S5 "i" success transition; change failure transition of S12 from S4 to S0 |
| 13 | 14 | 1 | 0 | 6 | add S13→S17 "d" success transition; change failure transition of S13 from S14 to S0; add S14 output code to S13 |
| 14 | 16 | 3 | 0 | 5 | add S14→S17 "d" success transition; change failure transition of S14 from S16 to S0 |

FIG. 2D

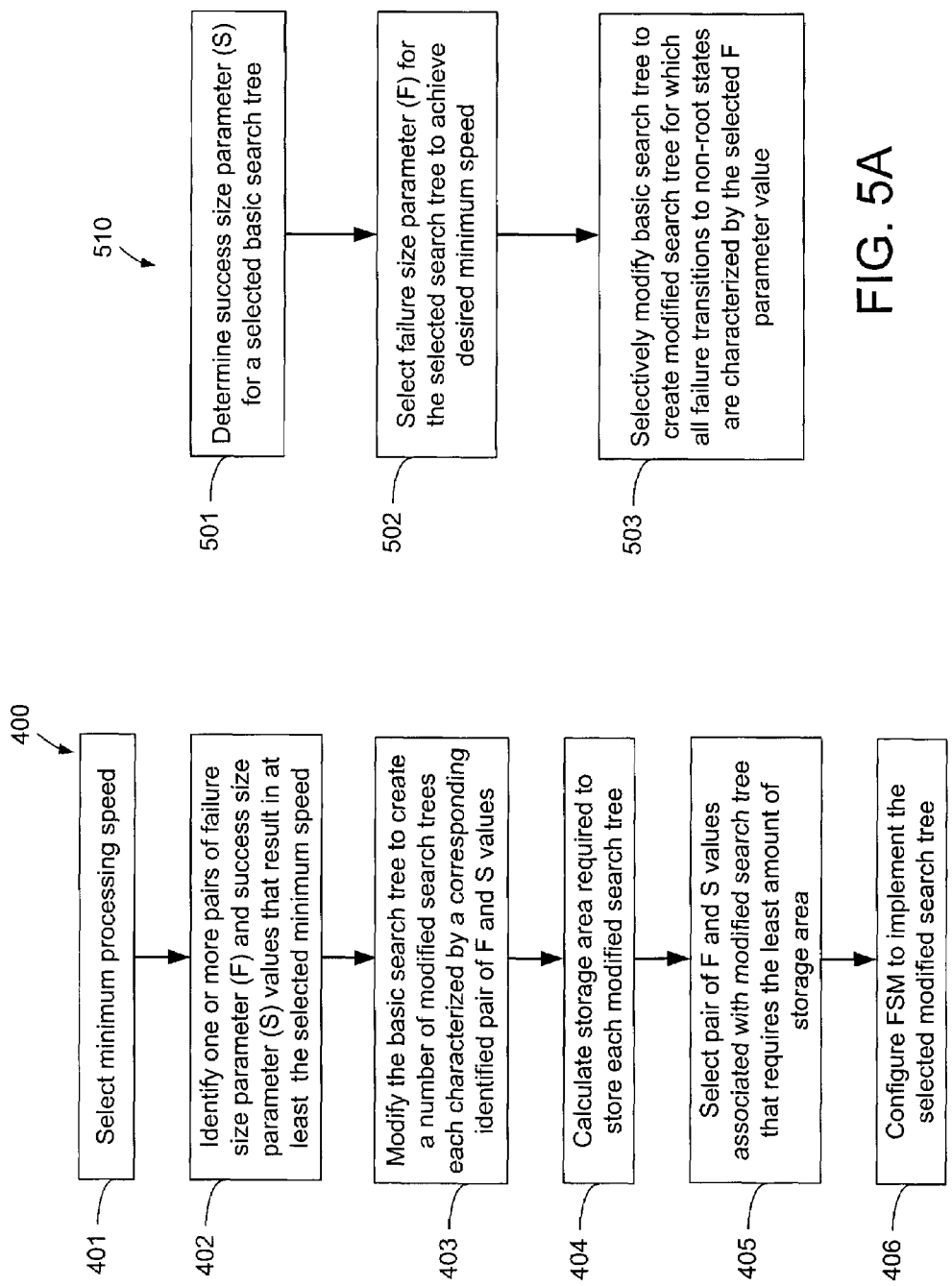

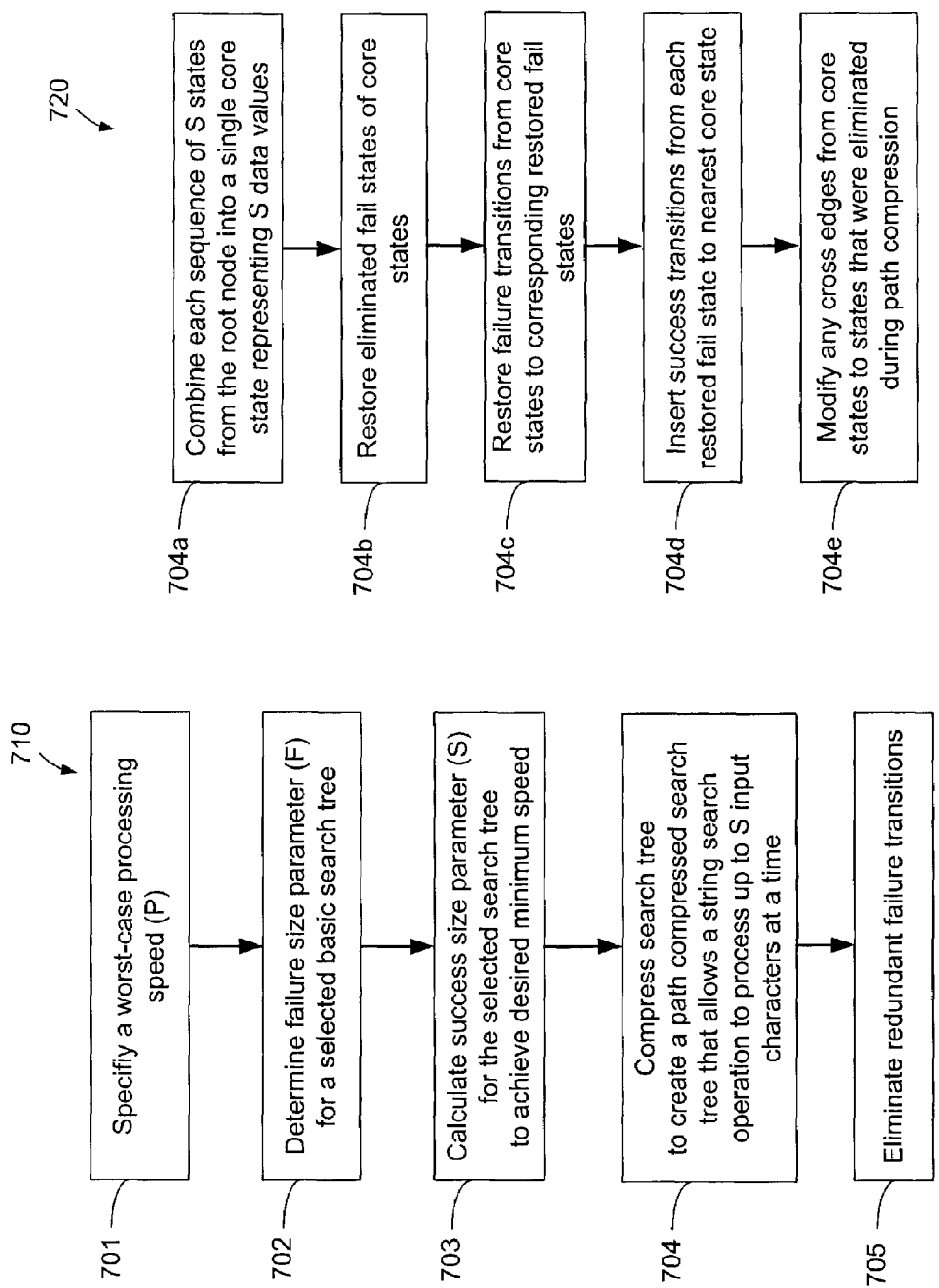

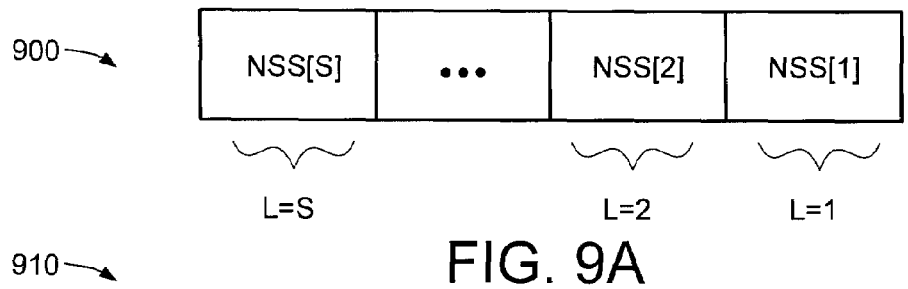
FIG. 9A
| state | NSS[2] | NSS[1] |
|---|---|---|
| S0 | 1 | 0 |
| S1 | 1 | 0 |
| S2 | 1 | 0 |
| S3 | 1 | 0 |
| S4 | 1 | 1 |
| S6 | 0 | 1 |
| S7 | 0 | 0 |
| S9 | 1 | 0 |
| S11 | 1 | 0 |
| S13 | 0 | 0 |
| S14 | 0 | 0 |
| S15 | 1 | 0 |
| S16 | 1 | 0 |
| S18 | 0 | 1 |
| S19 | 0 | 0 |
FIG. 9B
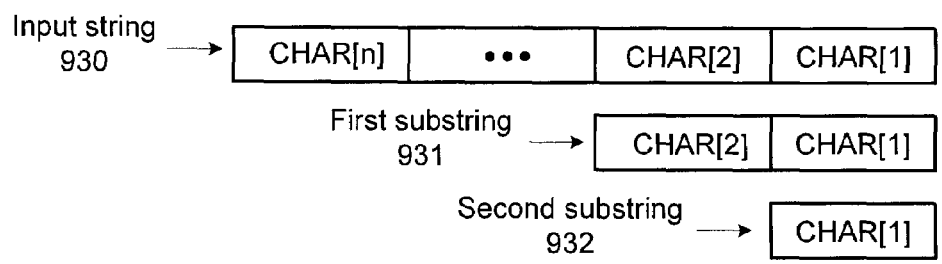
FIG. 9D

Signature Definition
**K1: raining
K2: rains
K3: drains
K4: nsdaq**

1000C

ITERATIVE COMPARE OPERATIONS USING NEXT SUCCESS SIZE BITMAP

CROSS-REFERENCE TO RELATED APPLICATIONS

This application claims the benefit under 35 USC 119(e) of the co-pending and commonly owned U.S. Provisional Application No. 60/885,607 entitled "Optimizing Multiple Pattern Search Operations" filed on Jan. 18, 2007, which is incorporated by reference herein.

FIELD OF INVENTION

This invention generally relates to the field of string search devices and, in particular, to optimizing the processing speed and storage area requirements of search trees used to implement multiple pattern search operations on an input data sequence.

BACKGROUND OF RELATED ART

The problem of string searching occurs in many applications. The string search algorithm looks for a string called a "pattern" within a larger input string called the "text." Multiple string searching refers to searching for multiple such patterns in the text string without having to search in multiple passes. In a string search, the text string is typically longer than several million bits long with the smallest unit being one octet in size. The start of a pattern string within the text is typically not known. A search method that can search for patterns when the start of patterns within the input string is not known in advance is known as unanchored searching. In an anchored search, the search algorithm is given the input string along with information on the offsets for start of the strings.

A network system attack (also referred to herein as an intrusion) is usually defined as an unauthorized or malicious use of a computer or computer network. In some cases, a network system attack may involve hundreds to thousands of unprotected network nodes in a coordinated attack, which is levied against specific or random targets. These attacks may include break-in attempts, including but not limited to, email viruses, corporate espionage, general destruction of data, and the hijacking of computers/servers to spread additional attacks. Even when a system cannot be directly broken into, denial of service attacks can be just as harmful to individuals and companies, who stake their reputations on providing reliable services over the Internet. Because of increasing usage and reliance upon network services, individuals and companies have become increasingly aware of the need to combat system attacks at every level of the network, from end hosts and network taps to edge and core routers.

Intrusion Detection Systems (or IDSs) are emerging as one of the most promising ways of providing protection to systems on a network. Intrusion detection systems automatically monitor network traffic in real-time, and can be used to alert network administrators to suspicious activity, keep logs to aid in forensics, and assist in the detection of new viruses and denial of service attacks. They can be found in end-user systems to monitor and protect against attacks from incoming traffic, or in network-tap devices that are inserted into key points of the network for diagnostic purposes. Intrusion detection systems may also be used in edge and core routers to protect the network infrastructure from distributed attacks.

Intrusion detection systems increase protection by identifying attacks with valid packet headers that pass through firewalls. Intrusion detection systems provide this capability by searching both packet headers and payloads (i.e., content) for known attack data sequences, referred to herein as "signatures," and following prescribed actions in response to detecting a given signature. In general, the signatures and corresponding response actions supported by an intrusion detection system are referred to as a "rule-set database," "IDS database" or simply "database." Each rule in the database typically includes a specific set of information, such as the type of packet to search, a string of content to match (i.e., a signature), a location from which to start the search (e.g., for anchored searches), and an associated action to take if all conditions of the rule are matched. Different databases may include different sets of information, and therefore, may be tailored to particular network systems or types of attack.

At the heart of most modern intrusion detection systems is a string matching engine that compares the data arriving at the system to one or more signatures (e.g., strings or patterns) in the rule-set database and flags data containing an offending (e.g., matching) signature. As data is generally searched in real time in ever-faster network devices and rule databases continue to grow at a tremendous rate, string matching engines require rapidly increasing memory capacity and processing power to keep pace. Consequently, to avoid the escalating costs associated with ever-increasing hardware demands, designers have endeavored to improve the efficiency of the string matching methodology itself.

For example, FIG. 1A illustrates a goto-failure state graph or search tree embodying a signature definition including signatures K1-K4, where K1="raining," K2="rains," K3="drains," and K4="nsdaq." The state graph 100A includes a root node (S0) and nineteen elemental states 1-19 (hereinafter denoted as S1-S19) that form a search tree for the signatures K1-K4. Each of the nineteen states S1-S19 is reached from a previous state by a data-match or success transition that represents a corresponding character of the signatures K1-K4. In FIG. 1A, each success transition (which are sometimes referred to as goto transitions) is shown by a solid line extending from the previous state along with the edge "success" character value that enables the success transition to the next state (NS). Further, each of non-root states S1-S19 includes a "failure transition" to root node S0 that is taken if a current character (CC) of an input string does not match any success transitions originating at that state. For simplicity, only the failure transition 110 from state S1 to S0 is shown in FIG. 1A. However, it is to be understood that each of non-root states S1-S19 includes a failure transition to the root node S0. In addition, states S7, S13, S14, and S19 are designated as output states (and shown in bold to indicate such) because if any of those states is reached, at least one of the signatures has been matched by the input string, and an output code indicating the matching signature may be provided.

Each state in the search tree 100A can be viewed as representing a prefix of one or more of the signatures K1-K4. For example, state S3 represents a match between an input string and the prefix "rai" of signatures K1 and K2). Each of the states having two or more success transitions is referred to herein as a branch node, and each sequence of states subsequent to the branch node is referred to as a sub-branch. Thus, the strings that share a common prefix also share a corresponding set of parent states in the search tree. For example, search tree 100A includes three branches originating at root node S0. The first branch includes an initial state S1 and subsequent states S2-S7 and S14, where states S5-S7 form a first sub-branch at branch S4 that together with states S1-S4 represents K1="raining," and state S14 forms a second sub-branch at S4 that together with states S1-S4 represent K2="rains." The second branch includes an initial state S8 and subsequent states S9-S13 that represents K3="damns." The third branch includes an initial state S15 and subsequent states S16-S19 that represent K4="nsdaq." Further, the distance of a state from the root node in the goto graph is referred to as the depth of that state. For example, states S1, S8, and S15 have a depth of 1, states S2, S9, and S16 have a depth of 2, and so on.

For search trees such as goto graph 100A of FIG. 1A, a storage device typically stores state information for up to N*W nodes, where N is the number of signatures and W is the average length of a signature in bytes. The state information for each node typically includes the node's fail state, one or more success transitions and corresponding next states, and an output code.

During search operations between an input text string and the signatures K1-K4, a string search engine (not shown in FIG. 1A for simplicity) may use an input string cursor (C) to sequentially identify characters of the input string for comparison with the signature characters associated with success transitions from a current state (CS) of the search tree 100A. Further, a back pointer (BP) may be used to identify the first character of a potentially matching string within the input string.

For example, during a string search operation between an input string S1="rains" and the signatures K1-K4 according to the search tree 100A of FIG. 1A, the cursor (C) and the back pointer (BP) are first initialized to zero so that both C and BP point to the first character "r" in the input string S1="rains." Also, the current state of the search engine is initialized to the root node S0 of the search tree. Then, a search engine operating according to the search tree 100A compares the current character (CC) identified by the cursor (e.g., C=0 and CC="r") with the success transitions originating at state S0. Because CC="r" matches the "r" success transition 101 at S0, the search engine transitions from state S0 to S1 via the success transition 101. Next, the cursor is incremented by one position so that C=1 and CC="a," and the search engine compares CC="a" with the success transitions originating at state S1. Because there is a match with the "a" success transition 102, the search engine transitions from S1 to S2 via the success transition 102. This process continues until the string search engine finally transitions from S4 to S14 via the "s" success transition upon a match with CC="s" when C=4. State S14, which is an output state, outputs a match code indicating that the input string matches the signatures K2="rains." Note that upon the signature match with K2, the back pointer remains at BP=0 and thus identifies the "r" in the input string as the first character of the matching string. After the match condition is output, the search engine returns to the root node S0, the cursor and back pointer are incremented to the next character in the input string, thereby having traversed all the characters of the matching string "rains."

When a failure transition is taken from a current state of the search tree 100A to the root node, the cursor is decremented (e.g., rewound) a number of positions in the input string equal to the number of states between the current state and the root node (e.g., the depth of the current state), minus one. For example, during a search operation between the input string S2="rainy" and the signatures K1-K4 implemented according to search tree 100A, edge failure occurs at state S4 because the current character at S4, which is "y," does not match either the "s" or the "i" success transition from state S4. Thus, at state S4, where C=4 and CC="y," the failure transition from S4 to the root node S0 (not shown for simplicity) is taken, and the cursor is rewound by 3 positions (e.g., from C=4 to C=1) to identify CC="a" as the next input character to be examined, which requires characters "a," "i," and "n" of the input string to be re-processed by the search engine. Accordingly, because edge failure at any non-root state of search tree 100A requires returning to the root node S0 and rewinding the cursor according to the number of prior state transitions traversed into the tree (e.g., according to depth of the current state), string search operations implemented according to search tree 100A may require substantial reprocessing of data.

String search processing speeds may be improved by replacing some failure transitions to the root node S0 in search tree 100A with failure edges to non-root states. More specifically, the search tree 100A may be modified using the well-known Aho-Corasick (AC) scheme so that instead of returning to the root node upon edge failure, the search engine may transition to another non-root state that constitutes an accumulated prefix within the path in which edge failure occurs. For example, FIG. 1B shows a basic goto-failure state graph 100B that is created by adding non-root failure edges using the Aho-Corasick scheme, which are shown as dotted lines.

For one example, during string search operations performed according to the basic goto-failure graph 100B, if edge failure occurs at state S12 (e.g., because the cursor data is not an "s"), the search engine, having traversed the path "drain" in the second branch and thus already detected the prefix "rain" associated with the first branch, may transition directly from state S12 to S4 via failure edge 114 (e.g., without returning to the root node and then traversing through states S1-S4). Upon the failure transition 114 from S12 to S4, which corresponds to detection of the prefix "rain" of the signature K2="rains," the cursor remains constant at C=4 (e.g., to identify "n" as CC), and the back pointer is incremented by one position from BP=0 to BP=1 (e.g., to identify "r" as the first character in a potentially matching string). Thus, the matching pattern "rains" within the input string "drains" may be subsequently detected at state S14 without having to return to root node S0 upon edge failure at state S12. This is in contrast to the non-optimized search tree 100A, which upon edge failure from state S12 to the root node S0 would require rewinding the cursor by four positions and then require re-processing the first four characters "r," "a," "i," and "n" of the input string. In this manner, transition to a non-root node in response to edge failure may save substantial data reprocessing and thus increase search speeds.

Note that search trees of the type shown in FIGS. 1A and 1B are commonly referred to as non-deterministic finite automaton because there can be more than one state transition on the same input character. For example, when an "i" input character is received at state S12 of the basic goto-failure search tree 100B, the failure transition 114 is first taken from S12 to S4, and then during another processing cycle, the "i" success transition is taken from S4 to S5.

It is known that a string search engine operating according to basic AC goto-failure state graphs such as search tree 100B of FIG. 1B typically have a worst-case processing speed of 0.5 characters per search cycle. More specifically, as described above, to complete a search operation between an input string and one or more signatures, the cursor and the back pointer must traverse over all the characters in the input string. Thus, for the goto-failure graph 100B of FIG. 1B, the cursor moves by one position on success transitions and remains constant on failure transitions, while the back pointer remains constant on success transitions and, in the worst-case scenario, increments by only one position on each failure transition. Accordingly, when searching an input string of Y characters using the goto-failure graph 100B of FIG. 1B, the search engine typically requires Y search cycles to traverse the cursor across the Y input characters and typically requires, in the worst-case scenario, Y additional search cycles to traverse the back pointer across the Y input characters, thereby resulting in a worst-case processing speed of Y characters/2Y cycles=0.5 character per search cycle.

Basic AC goto-failure state graphs that process one input character at a time, such as search tree 100B of FIG. 1B, may be further modified using AC techniques to achieve a worst-case processing speed that approaches 1 character per search cycle by adding enough cross edges (e.g., success transitions to states in other branches) to the state graph so that all failure transitions from non-root states may be eliminated. The resulting search tree is commonly known as a deterministic finite automaton (DFA) because exactly one state transition is made on each input character. More specifically, to eliminate all failure transitions in a goto-failure graph, a success transition for each possible path to a non-root state must exist for every state in the graph. For example, FIG. 1C shows a fully-expanded DFA search tree 100C created by expanding the basic goto-failure graph 100B of FIG. 1B to include an additional set of cross edges (also commonly referred to as next transitions) that allows for the elimination of all failure transitions. The newly added cross edges, which are illustrated as bold lines in FIG. 1C, collectively ensure that a failure transition is never taken from a non-root state, for example, so that the cursor is incremented on every state transition in the search tree. For example, if an input character "i" is received at state S12 of search tree 100C, the state machine transitions directly to S5 via the "i" cross edge from state S12 to S5 and increments the cursor to the next input character, thereby requiring only one state transition (and thus only one memory access) to process the input character "i." In this manner, search operations performed according to the fully expanded state graph 100C of FIG. 1C typically process Y input characters in Y search cycles, thereby resulting in a worst-case processing speed of approximately 1 character per search cycle.

Although achieving nearly double the worst-case processing speed of search operations as the goto-failure state graph 100B of FIG. 1B, the fully-expanded AC DFA state graph of FIG. 1C requires significantly more memory area to store state information. For a simple example, while most of the states S1-S19 of search tree 100C of FIG. 1C include three success transitions, most of the states S1-S19 in state graph 100B of FIG. 1B include only one success transition, and therefore state graph 100C may require up to 3 times more storage area than state graph 100B. For actual implementations that involve hundreds of signatures, adding enough cross edges to the basic AC goto-failure search tree of the type depicted in FIG. 1B to create a fully-expanded AC search tree of the type depicted in FIG. 1C may increase the hardware storage requirements by two or more orders of magnitude. More specifically, for example, for a state graph that embodies hundreds of signatures each having an average length of between 60-70 ASCII-encoded characters (which uses an 8-bit encoding scheme to represent 256 different characters), which is common in today's security and search engine environments, it is likely that an average of 256 cross edges must be added to each state in the graph to eliminate all failure transitions, thereby requiring approximately 256 times more memory to store state information than basic goto-failure graphs of the type depicted in FIG. 1B.

As a result, for modern IDS applications in which a signature definition includes a large number of signatures, it is impractical to build a hardware implementation of a corresponding fully-expanded AC DFA search tree because of storage limitations of currently available memory devices. For example, to store state information for a fully-expanded state graph that embodies thousands of signatures each including dozens of characters, several million storage entries may be required, which is not feasible to implement using today's semiconductor storage devices.

Therefore, for modern string search operations, there is a need to dynamically balance processing speeds with storage area requirements to maximize the processing speeds achieved using a semiconductor storage device of a given size.

BRIEF DESCRIPTION OF THE DRAWINGS

The present invention is illustrated by way of example and not intended to be limited by the figures of the accompanying drawings, where:

FIG. 1C shows a fully-expanded goto search tree having no failure transitions;

FIG. 2C shows a table showing the fail states and removed prefix length values of failure transitions for the states of the goto-failure search tree of FIG. 1B;

FIG. 2D shows a table illustrating state information modifications to the goto-failure search tree 100B of FIG. 1B that result in creation of the limited expansion search tree of FIG. 6A;

FIG. 4 shows an illustrative flow chart depicting an exemplary search tree optimization operation in accordance with some embodiments of the present invention;

FIGS. 5A-5D show illustrative flow charts depicting an exemplary optimization operation for modifying the failure size parameter of a goto-failure search tree in accordance with some embodiments of the present invention;

FIGS. 7A-7B show illustrative flow charts depicting an exemplary optimization operation for modifying the success size parameter of a goto-failure search tree in accordance with some embodiments of the present invention;

FIG. 9A shows a next success size bitmap entry that may be included in the state entries of search trees created in accordance with some embodiments of the present invention;

FIG. 9B shows an exemplary next success size bitmap for the states of the path-compressed search tree of FIG. 8B;

FIG. 9D illustrates an input string and two overlapping substrings in an exemplary string search operation using the next string size bitmap of FIG. 9D;

Like reference numerals refer to corresponding parts throughout the drawing figures.

DETAILED DESCRIPTION

Figure 1A:
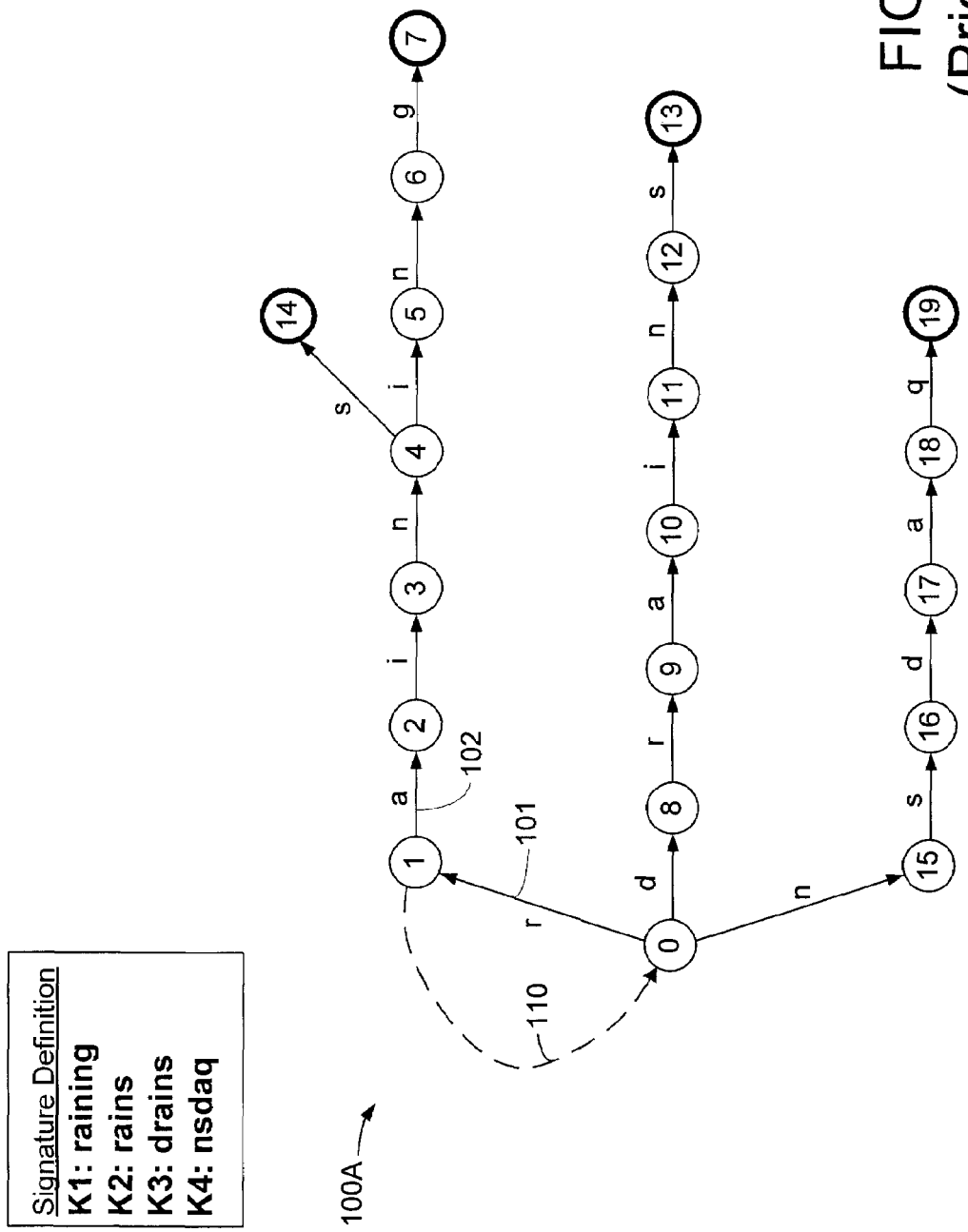
FIG. 1A shows a prior art search tree for pattern matching.

In the following description, numerous specific details are set forth such as examples of specific, components, circuits, and processes to provide a thorough understanding of the present invention. It will be apparent, however, to one skilled in the art that these specific details need not be employed to practice the present invention. In other instances, well known components or methods have not been described in detail in order to avoid unnecessarily obscuring the present invention. As used herein, the terms "search tree" and "state graph" refer to state diagrams that embody one or more signatures to be searched for in an input string during string search operations, and are thus interchangeable. Further, the term "success transition," which refers herein to a goto transition from a current state to a next state in a search tree, is also commonly referred to as a "success edge."

String matching apparatus and methods that achieve increased processing speeds without exponential increases in memory storage requirements are disclosed herein in various embodiments. More specifically, in accordance with some embodiments of the present invention, a method and/or apparatus may be used to selectively modify a search tree embodying a plurality of signatures to be compared with an input string of characters to create a modified search tree that requires a minimum amount of storage area for a specified minimum processing speed. For some embodiments, a minimum processing speed is first specified for a finite state machine configured to implement a search tree embodying a desired signature definition. Then, a number of pairs of failure size (F) and success size (S) parameter values are identified that result in a worst-case processing speed that is greater than the specified minimum processing speed, where F indicates a minimum number of input characters traversed on failure transitions and S indicates a maximum number of input characters traversed on success transitions. Next, the search tree is modified to create a number of modified search trees, each characterized by a corresponding one of the identified pairs of F and S values. Then, an amount of storage area required to store each modified search tree is calculated, and thereafter the modified search tree that requires the least amount of storage area is selected for implementation by the finite state machine. For another embodiment, a given amount of storage area may be specified, and the search tree may be selectively modified in accordance with present embodiments to achieve a maximum processing speed for the specified storage area. For yet another embodiment, any one of the modified search trees corresponding to the identified F and S parameter pairs may be selected for implementation by the finite state machine.

For some embodiments, a string search engine may employ a next search size (NSS) bitmap to determine how many input characters are to be initially compared with the success transitions at the associated state of the search tree, and if the compare operation results in edge failure, whether to compare one or more groups of fewer input characters (e.g., overlapping substrings of the input string) to the success transitions at the associated state during one or more successive compare operations. As explained in detail below, the NSS bitmap not only allows the number of input characters initially compared with the success transitions at a given state to be dynamically adjusted, but also allows for one or more subsequent iterative compare operations between decreasing numbers of input characters (e.g., overlapping substrings of decreasing size) and the success transitions upon initial mismatch results at a given state of the search tree.

Figures 2A, 2B:
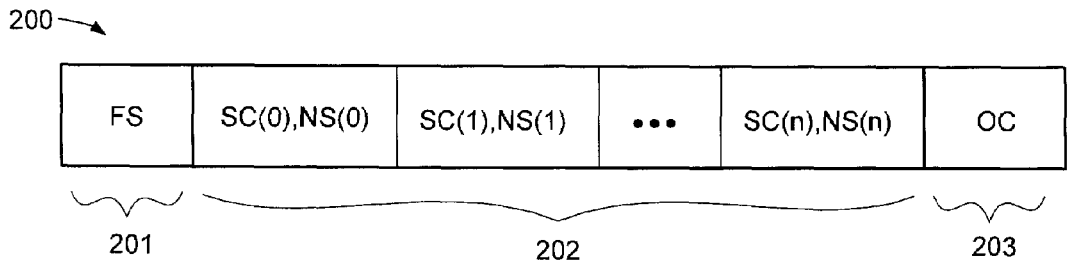
FIG. 2A shows an exemplary data format for the state entries of a typical search tree.
FIG. 2B shows a table showing state information for the basic goto-failure search tree of FIG. 1B.

FIG. 2A depicts an exemplary state entry 200 that may be used to store state information for each of the nodes of search trees such as search trees 100A-100C. State entry 200, which includes a fail state (FS) field 201, a success transition (ST) field 202, and an output code (OC) field 203, may be represented as {FS; ST[0:n]; OC}. More specifically, FS field 201 stores a single state value that indicates the fail state of the state represented by state entry 200, ST field 202 may store any number of success character (SC) and corresponding next state (NS) pairs, and OC field 203 stores one or more output codes each indicating a match with a corresponding signature embodied in the search tree.

Figure 1B:
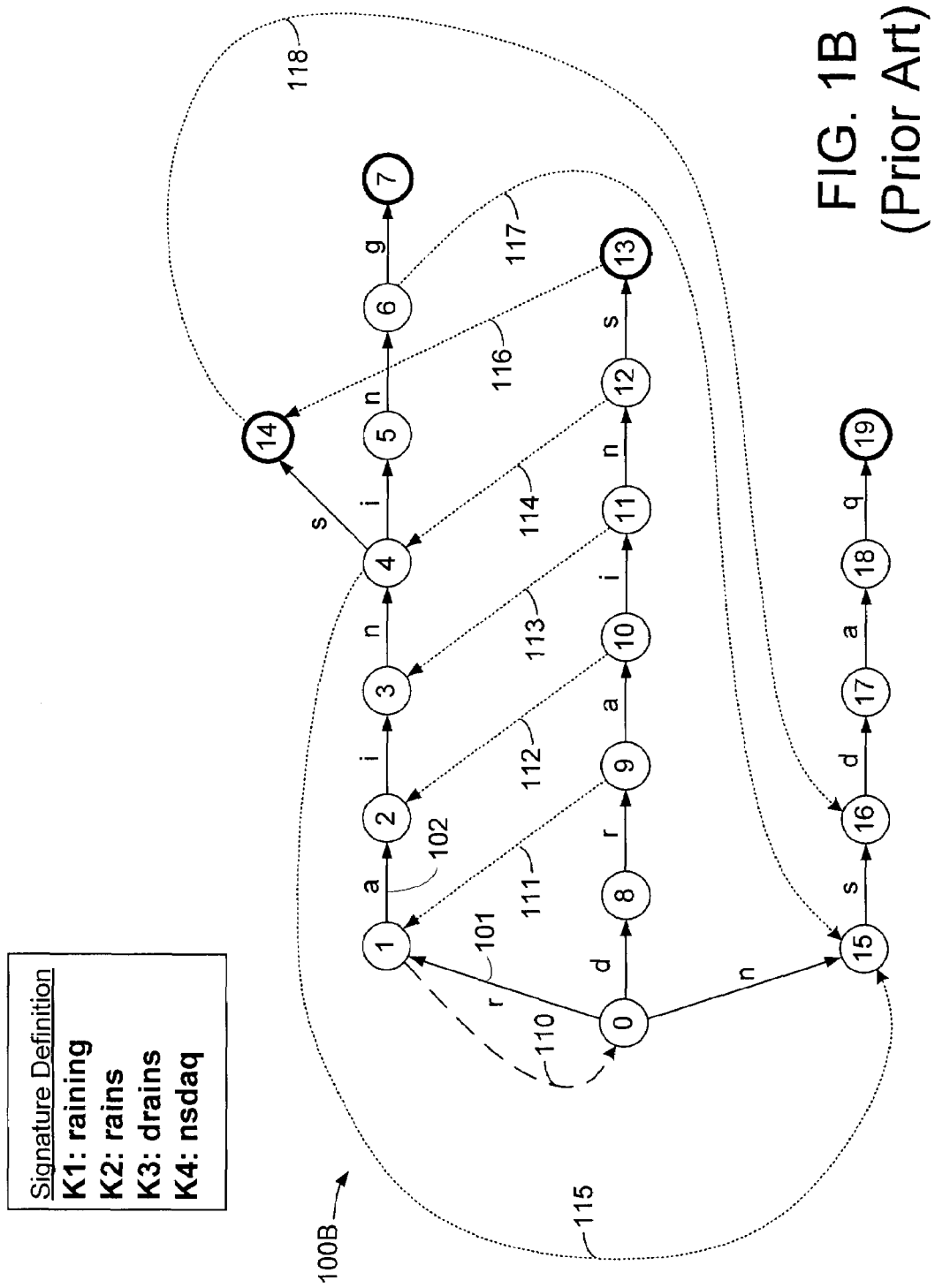
FIG. 1B shows a basic goto-failure search tree for pattern matching.

For one example, the state entry (STEN) for state S4 of the goto-failure graph 100B may be represented as STEN4={0; i,5; s, 14; 0}, where FS=0 indicates that the root node S0 is the fail state of S4; ST[0]="i,5" indicates that state S4 includes an "i" success transition to a next state S5; ST[1]="s,14" indicates that state S4 includes an "s" success transition to a next state S14; and OC=0 indicates that state S4 does not include an output code. For another example, the state entry for state S13 of goto-failure graph 100B of FIG. 1B may be represented as STEN13={0; 0; K3}, where FS=0 indicates that the root node S0 is the fail state of state S13, SE=0 indicates that there are no success transitions from state S13, and OC=K3 indicates that state S13 is an output state associated with the signature K3="drains." The state entries STEN0-STEN19 of states S0-S19 of the basic AC goto-failure search tree 100B of FIG. 1B are summarized in Table 210 of FIG. 2B.

Table 210 also shows the number of memory bytes required to store each of the state entries for the basic AC search tree 100B. More specifically, for the state entries depicted in Table 210, each FS field requires 1 byte of memory storage area, each success character requires 1 byte of memory storage area, each next state requires 1 byte of memory storage area, and each output code requires 1 byte of memory storage area. Thus, for example, S4's state entry STEN4={15; i,5; s,14; 0} requires 6 bytes, while S19's state entry STEN19={0; 0; K4} requires 3 bytes. Accordingly, the state entries for states S0-S19 of the goto-failure graph 100B, as depicted in Table 210 of FIG. 2B, require approximately 82 bytes of memory storage area. Although not described herein, various well-known techniques may be employed to compact the state entries.

Figure 3A:
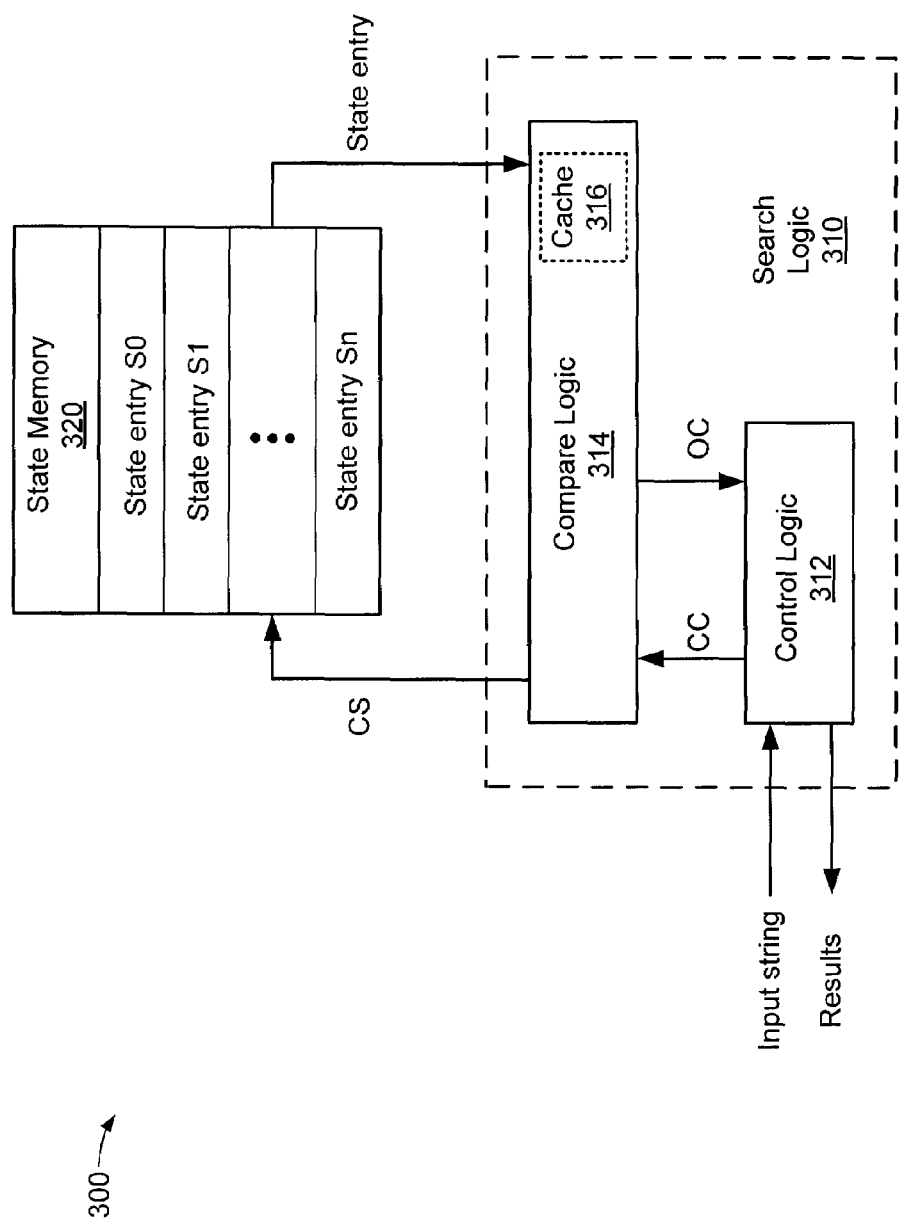
FIG. 3A shows a simplified functional block diagram of a string search engine that may be used to perform string search operations in accordance with the present invention.

Some embodiments of the present invention are discussed below in the context of a search engine that employs an SRAM (or DRAM) device to store the state information for search trees that embody the signature definition to be searched for during string search operations. For example, FIG. 3A shows a string search engine 300 that may be programmed to implement string search operations according to various state diagrams such as those depicted in FIGS. 1A-1C. String search engine 300 includes search logic 310 coupled to a state memory 320. State memory 320, which may be any suitable type of memory device such as, for example, an SRAM device, includes a plurality of storage locations for storing state information for search trees to be used in search operations performed by search logic 310. For simplicity, each storage location (e.g., row) of state memory 320 is depicted in FIG. 3A as storing a state entry for a corresponding one of states S0-Sn. However, for actual embodiments, some state entries may require more than one storage location of state memory 320, while one or more other states may be stored together in a single storage location of state memory 320. Further, for purposes of discussion herein, state information stored in state memory 320 may be formatted as illustrated in FIG. 2A. However, for other embodiments, state information may be stored in state memory 320 using other suitable data formats or encoding techniques.

Search logic 310 includes control logic 312 and compare logic 314. Control logic 312, which includes an input port to receive an input string from a network connection (not shown for simplicity) and an output port to provide search results to the network connection, controls search operations between the input string and the signatures embodied by the search tree and stored as state entries in state memory 320. Compare logic 314, which is coupled to state memory 320 and to control logic 312, implements the string search operation using a state transition scheme embodied by the search tree stored in state memory 320. Further, although not shown in FIG. 3A for simplicity, search logic 310 typically includes registers, logic, and/or other suitable circuitry for storing and incrementing the input cursor (C) and the back pointer (BP).

For example, during search operations, compare logic 314 provides a current state (CS) value as an address to state memory 320, which in response thereto outputs a corresponding state entry (STEN) to compare logic 314. Compare logic 314 then compares the current character (CC) extracted from the input string by control logic 312 (e.g., in response to the cursor values) to the success characters (SC) of the success transition fields in the retrieved state entry (STEN) to determine the next state in the search tree. If the cursor data matches one of the state's success transitions, the corresponding next state (NS) value is read from the state entry, and the next state value is used as an address to retrieve the corresponding "next" state entry from state memory 320. For example, if the state machine is in state S1 of search tree 100B, a cursor data value CC="a" results in a match with the "a" success transition 102, and the state machine transitions from state 51 to state S2 via the "a" success transition by reading the NS=2 value from the success transition field of S1's state entry, and then retrieving the state entry for S2 from state memory 320 using NS=2 as a read address.

Otherwise, if the cursor data does not match any of the success transitions at the current state, the fail state (FS) value is read from the state entry, and the fail state value is used as an address to retrieve the corresponding "fail" state entry from state memory 320. The retrieved fail state entry is then used as the current state for the next search cycle. For example, if the state machine is in state S1 of search tree 100B, a cursor data value other than CC="a" results in edge failure, and thus the FS=0 value from S1's state entry is used to load the state entry for S0 as the next current state, thereby facilitating the state machine's transition from state S1 to the root node S0 (e.g., via the failure transition 110). Further, if the current state entry contains a non-zero output code (OC) indicating a signature match, the output code is provided to control logic 312 for outputting information corresponding to the signature match to the network connection.

For some embodiments, compare logic 314 includes a cache memory 316 that stores the state entry for the root node S0, as depicted in FIG. 3A. In this manner, the root node's state entry may be locally stored within compare logic 314 and may therefore be retrieved for compare operations in compare logic 314 without accessing state memory 320. As a result, edge failures to the root node do not require access to state memory 320, thereby eliminating SRAM latencies when the state machine fails to the root node. Of course, for actual embodiments, other state entries (e.g., such as state entries that are frequently accessed by the search engine) may also be stored in cache memory 316. For other embodiments, cache memory 316 may be eliminated.

As described above, the cursor (C) points to the current character of the input data, and the back pointer (BP) points to the first character in a potentially matching string within the input string. Thus, the distance (e.g., the number of characters positions) between the back pointer (BP) and the cursor (C) indicates the prefix match length (PML) of the potentially matching string, where PML=C−BP. Further, as discussed above, when the back pointer moves forward on a failure transition to another state, the distance between the back pointer and the cursor is reduced, thereby reducing the PML. Thus, in accordance with some embodiments of the present invention, the number of character positions that the back pointer moves forward on a failure transition is denoted as the removed prefix length (RPL) associated with the failure transition. As a result, when the string search engine takes a failure transition from a first state to a second state, the PML of the input string at the second state is equal to the PML of the input string at the first state minus the RPL of the failure transition.

To aid in the understanding of the concepts of PML and RPL as related to C and BP, consider a search operation between an input string S1="rainy" and signatures K1-K4 using the goto-failure graph 100B. During the search operation, the search engine successively transitions from state S0 to state S4 via success transitions "r," "a," "i," and "n," where at state S4, the cursor C=4 and the back pointer BP=0. Thus, the PML associated with state S4 is PML=C−BP=4−0=4, which corresponds with the 4 character prefix "rain." Thereafter, upon edge failure at S4 (i.e., the next input character "y" does not match the "i" or "s" success transitions from S4, the state machine fails to state S15, and the back pointer is incremented by 3 positions from BP=0 to BP=3 to identify "n" as the first character of a potentially matching string. Thus, the failure transition 115 from state S4 to S15 has an RPL=3 because the back pointer is incremented by 3 characters on the failure transition 115 (and also because the prefix match "rain" associated with state S4 is 3 characters longer than the prefix match "n" associated with state S15, and thus three characters are "removed" from the prefix match length upon edge failure from state S4 to S15 via failure transition 115). The RPL value of a failure transition may also be described as the difference between the depth of the source state and the depth of the fail state. For example, referring again to FIG. 1B, source state S9 fails to fail state S1 via failure transition 111. Because S9 has a depth D=2 and S1 has a depth D=1, the difference in depths, 2−1=1, is equal to the RPL of the corresponding failure transition 111.

Further, in accordance with some embodiments of the present invention, the maximum number of characters in the input string that the cursor (C) traverses on a success transition is denoted herein as the success size (S) parameter of the search tree, and the worst-case number of characters (e.g., the fewest number of characters) that the back pointer BP traverses on a failure edge to a non-root state is denoted herein as the failure size (F) parameter of the search tree. Thus, to process Y characters of an input string, the cursor requires Y/S processing cycles, and the back pointer requires Y/F processing cycles. Therefore, in accordance with the present invention, the worst-case speed (P) to process Y characters of the input string may be expressed below as:

$$P = \frac{Y}{Y/S + Y/F} = \frac{1}{(1/S) + (1/F)} = \frac{S*F}{S+F}.$$

For example, because a search engine operating according to the goto-failure graph 100B of FIG. 1B increments the cursor C by one position on each success transition, and includes several non-root failure edges having an RPL=1 (e.g., failure transitions 111-114 and 116), the goto-failure graph 100B may be characterized as having S=1 and F=1. Accordingly, a search engine operating according to the goto-failure graph 100B of FIG. 1B achieves a worst-case processing speed P=1*1/(1+1)=0.5 characters per processing cycle.

By comparison, because a search engine operating according to the fully expanded state graph 100C of FIG. 1C increments the cursor C by one position on each success transition, and does not include any failure transitions from non-root states, the fully expanded state graph 100C of FIG. 1C may be characterized as having S=1 and F→∞, respectively. Accordingly, a string search engine operating according to the state graph 100C of FIG. 1C achieves a worst-case processing speed $$P = \frac{1}{(1/1) + (1/\infty)} = 1*\infty/(1+\infty) \approx 1.0$$

characters per processing cycle.

However, as mentioned above, to achieve a "full" speed of P≈1.0 characters per cycle using a state graph having S=1, as depicted in FIG. 1C, each state in the search tree must include success transitions to all possible paths to non-root states (e.g., to allow for the elimination of all failure transitions from non-root states), which significantly increases the memory area required to store the search tree's state information. More specifically, for applications in which the signature definition includes hundreds of signatures each having dozens of characters, adding enough cross edge to the basic goto-failure state graph 100B of FIG. 1B to eliminate all non-root failure transitions, as depicted by the fully expanded state graph 100C in FIG. 1C, may increase the storage requirements of the search tree by two orders of magnitude or more. Thus, although it is desirable to increase the worst-case processing speed of goto-failure graph 100B beyond 0.5 characters per cycle, implementing search operations according to the fully expanded state graph 100C to double the worst-case processing speed to approximately 1 character per cycle is not feasible because of the corresponding exponential increase in storage area requirements.

Figure 3B:
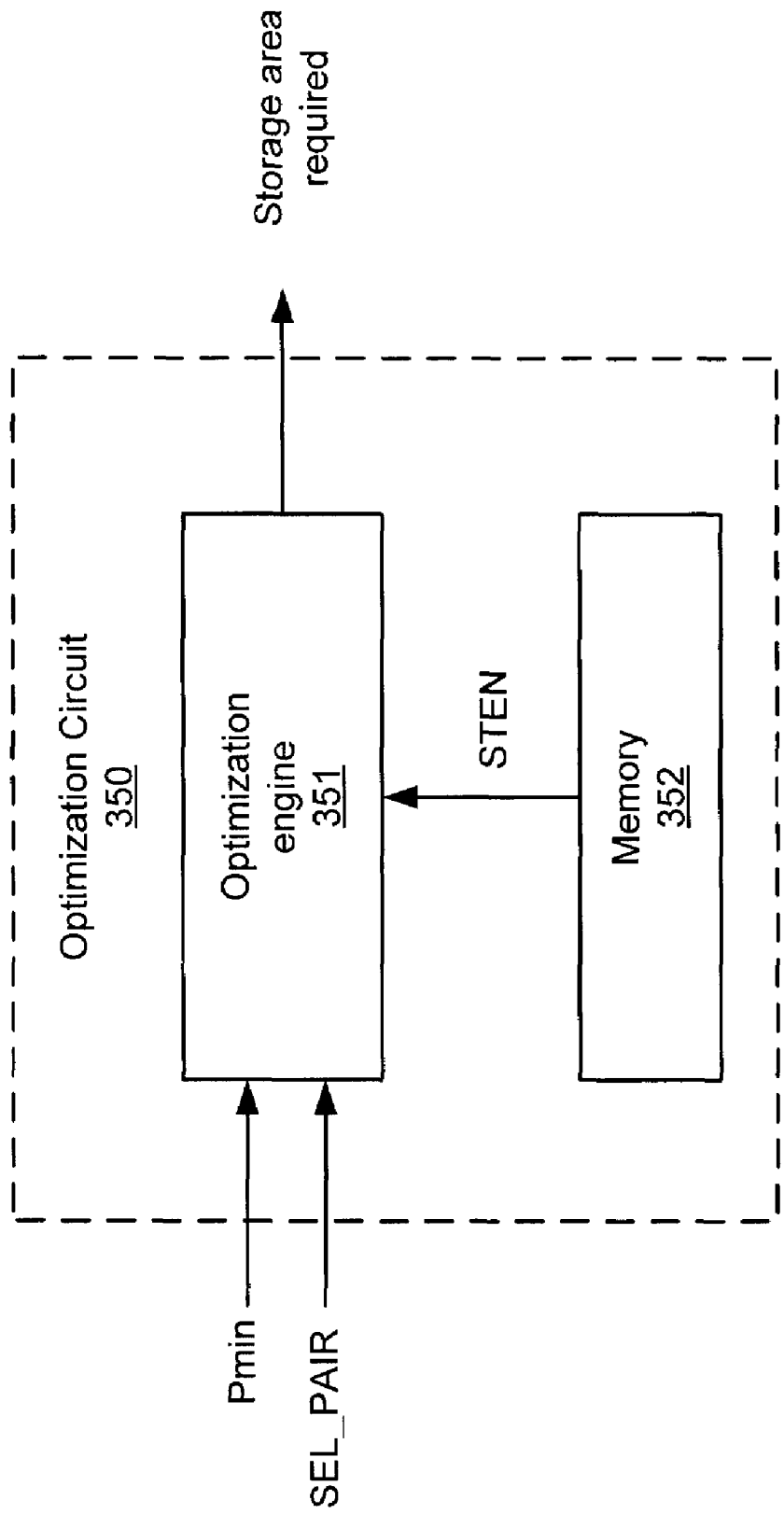
FIG. 3B shows a simplified functional block diagram of an optimization circuit that may be used to modify a basic goto-failure search tree to create limited expansion state graphs in accordance with the present invention.

Thus, in accordance with some embodiments of the present invention, the S and/or F parameter values associated with a selected state graph may be manipulated to generate a limited expansion state graph that achieves an acceptable balance between worst-case processing speed P and the storage area required to store the state entries that implement the state machine. More specifically, for some embodiments, the state transitions of a given goto-failure state graph may be selectively modified to achieve a given minimum processing speed for a maximum storage amount. For example, FIG. 3B shows a functional block diagram of an optimization circuit 350 that may be used to modify the state transitions of a basic state graph to create a modified state graph having desired F and S parameter values. Optimization circuit 350 includes optimization engine 351 and a memory 352. Memory 352, which may be any suitable memory device, stores state information that implements a state machine for searching input strings for one or more signatures according to a specified search tree, for example, such as search tree 100B of FIG. 1B. Optimization engine 351 is coupled to memory 352, and is configured to receive or select a minimum processing speed parameter (Pmin), which may be provided by a user.

In operation, optimization engine 351 calculates a plurality of various F and S parameter pair values that result in a worst-case processing speed that is greater than Pmin. Then, for each F and S parameter pair, optimization engine 351 modifies the state entries of the goto-failure state graph stored in memory 352 to create a modified state graph that operates according to the F and S parameter pair, and then calculates the amount of memory required to store the modified state graph. For some embodiments, optimization engine 351 is responsive to a parameter select pair signal SEL_PAIR provided, for example, by the user. For some embodiments, SEL_PAIR may instruct optimization engine 351 to calculate the required storage area for a specified number of F and S parameter pairs. For other embodiments, SEL_PAIR may instruct optimization engine 351 to calculate the required storage area for one or more selected F and S parameter pairs.

FIG. 4 is an illustrative flow chart 400 that depicts an exemplary operation of optimization circuit 350 for modifying the F and S parameter values of a basic state graph to achieve a desired minimum worst-case processing speed. First, a minimum worst-case processing speed (Pmin) is selected (step 401). For some embodiments, Pmin may be determined by the application requirements. For this example, a minimum processing speed Pmin=0.7 characters per cycle is selected and provided to optimization engine 351.

Next, one or more pairs of F and S parameter values that result in at least the desired minimum worst-case processing speed are identified (step 402). For example, optimization engine 351 calculates a plurality of F and S parameters pairs that result in a worst-case processing speed that is greater than Pmin using the equation $$P = \frac{Y}{Y/S + Y/F} = \frac{S*F}{S+F}.$$

For this example, several possible pairs of F and S parameter values that result in the selected worst-case processing speed of 0.7 characters are listed below in Table 1 (for simplicity, Table 1 does not list all possible F and S parameters pairs that result in a worst-case speed that is greater than 0.7 characters per cycle).

TABLE 1

| pair (F:S) | | | | | | | | |
|---|---|---|---|---|---|---|---|---|
| 1:4 | 4:1 | 2:2 | 1:3 | 3:1 | 2:4 | 4:2 | 2:3 | 3:2 |
| Speed 0.8 | 0.8 | 1.0 | 0.75 | 0.75 | 1.33 | 1.33 | 1.2 | 1.2 |

For example, using the processing speed equation described above, the F=1 and S=4 parameter pair achieves a worst-case processing speed of 1*4/(1+4)=4/5=0.8 characters per cycle, and the F=4 and S=1 parameter pair also achieves a worst-case processing speed of 4*1/(4+1)=4/5=0.8 characters per cycle. For another example, the F=1 and S=3 parameter pair achieves a worst-case processing speed of 1*3/(1+3)=3/4=0.75 characters per cycle, and the F=3 and S=1 parameter pair also achieves a worst-case processing speed of 3*1/(3+1)=3/4=0.75 characters per cycle.

Then, for each identified F and S parameter pair, the basic goto-failure state graph is optimized (e.g., modified) to create a modified state graph that operates according to the selected F and S parameter values pair (step 403). For example, optimization engine 351 selectively modifies (e.g., by adding, changing, and/or deleting) the state transitions of the basic goto-failure state graph 100B to create a number of modified state graphs, each of which operates according to (e.g., and is thus characterized by) a corresponding F and S parameter pair.

Next, the memory area required to store the state information for each modified state graph is calculated (step 404). For example, for each selected F and S parameter pair, optimization engine 351 calculates the memory area required to store all of the state entries for the state graph modified to operate according to the selected F and S parameter pair.

Finally, the modified search tree that requires the least amount of storage area is identified, and the corresponding F and S parameter pair is selected as the optimum parameter pair (step 405). For example, optimization engine 351 compares the storage area requirements for all the modified search trees that result in a worst-case processing speed that is greater than Pmin, and identifies the parameter pair associated with the modified state graph that requires the least amount of storage area to store its state information. In this manner, embodiments of the present invention allow the worst-case processing speed of the basic search tree to be increased with an acceptable increase in storage area requirements, thereby allowing for an effective optimization between processing speed and storage area requirements. Of course, for other embodiments, the modified search tree corresponding to any of the identified F and S pairs may be selected for implementation by the finite state machine (FSM).

Thereafter, a finite state machine (e.g., such as search engine 300 of FIG. 3A) may be configured to implement the modified search tree which requires the least amount of storage area and that achieves a worst-case processing speed that is greater than the specified minimum operating speed (step 406).

Figures 5B, 5D:
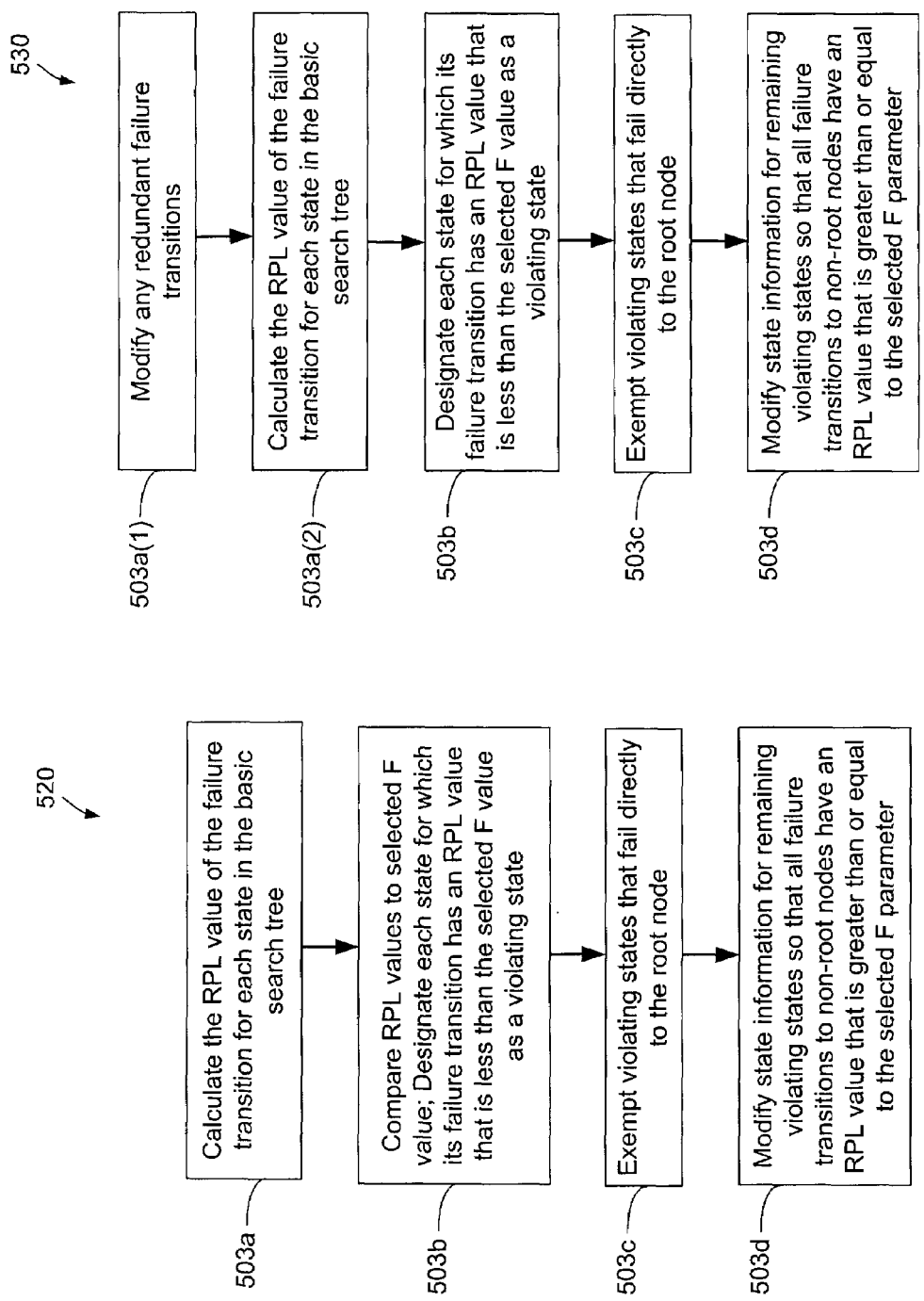
Figure 5C:
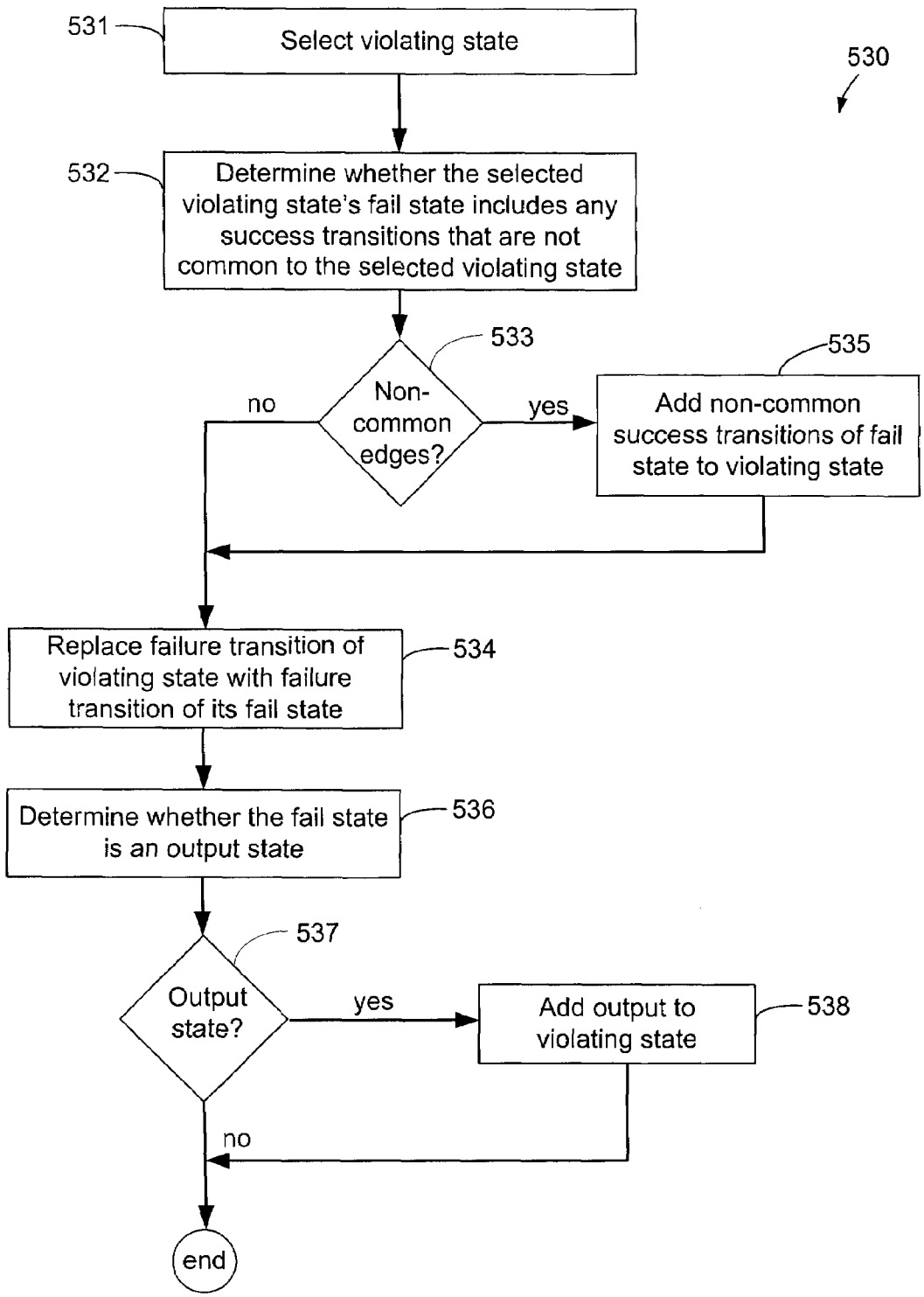

A first embodiment of the present invention for selectively modifying a given basic goto-failure state graph to create a limited expansion state graph characterized by a selected failure-size parameter F value is described below with respect to the illustrative flow charts of FIGS. 5A-5C. First, referring now to FIG. 5A, the S parameter of the given basic goto-failure graph is determined (step 501). For this example, the basic goto-failure graph 100B of FIG. 1B is selected. Because a search engine operating according to the goto-failure graph 100B traverses one character on each success transition, S=1 for goto-failure graph 100B, as described above.

Next, a value of F is selected that indicates a desired minimum number of characters to be traversed (e.g., by the back pointer) on failure transitions to non-root states (step 502). For this example, the worst-case failure size parameter is selected to be F=4, which achieves a worst-case processing speed of $$P = \frac{Y}{Y/S + Y/F} = \frac{S*F}{S+F} = 1*4/(1+4) = 0.8$$

characters per cycle. Alternatively, the desired worst-case processing speed may be selected for a search tree characterized by a given S value, and then a value of F that results in the desired worst-case processing speed for the given S value may be calculated using the above equation, for example, where $$F = \frac{S*P}{S-P}.$$

Then, the basic state graph is selectively modified in accordance with the present invention to create a limited expansion state graph for which all failure transitions to non-root nodes are characterized by the selected F parameter (e.g., so that all failure transitions to non-root states have an RPL that is greater than or equal to the selected F parameter value) (step 503). For this example, the state entries of the basic goto-failure graph 100B are selectively modified until all failure transitions to non-root nodes have an RPL that is greater than or equal to F=4.

More specifically, to create the limited expansion state graph from the basic goto-failure graph, the RPL value of each failure transition in the basic goto-failure graph is first calculated (step 503a). This calculation may be used to identify those states that may be modified in accordance with the present invention to increase processing speeds, as described in detail below. For this example, the RPL values associated with the failure transitions from states S1-S19 of the goto-failure graph 100B of FIG. 1B are summarized in Table 220 of FIG. 2C. The corresponding fail state of each state S1-S19 is also indicated in Table 220.

Next, all states in the basic goto-failure graph for which the failure transition has an RPL value that is less than the selected F parameter value are identified and designated as violating states (step 503b), for example, by comparing the RPL values of the failure transitions with the selected value of the F parameter. For the goto-failure graph 100B, states S1-S4 and S8-S17 are designated as violating states because each of their failure transitions has an RPL value that is less than F=4.

Then, for some embodiments, each violating state that fails directly to the root node is exempted from the "violating state" designation (step 503c). These states may be exempted from the "violating state" designation, regardless of the RPL values of their failure transitions, because failure to the root node S0 from these states does not adversely affect the worst-case processing speed. More specifically, because search engine 300 of FIG. 3A may store the state entry for S0 in cache memory, as described above, direct failure to the root node does not require the search engine to access state memory 320 to ascertain the next state, and thus the current character may be re-examined at the root node S0 in the same processing cycle that resulted in the failure to the root node. For this example discussed with respect to goto-failure graph 100B, states S1-S3, S8, and S15-S17 of FIG. 2C fail directly to the root node S0, and thus may be exempted from the designated violating state set. Accordingly, for this example, the remaining states in the designated violating state set are states S4 and S9-S14.

Alternatively, for other embodiments, all states that fail directly to the root node S0 may be excluded from being designated as violating states in step 503b, in which case step 503c may be eliminated. Thus, for such other embodiments, only states S4 and 9-S14 are initially designated as violating states.

Then, in accordance with the present invention, the state transition information for each of the remaining violating states is modified so that its failure transition has an RPL value that is greater than or equal to the selected F value (step 503d). For this example, the state transition information for each of the violating states S4 and S9-S14 is modified so that each of their failure transitions has an RPL z 4.

One exemplary operation for modifying the state information of each of the remaining violating states is described below with respect to the illustrative flow chart 530 of FIG. 5C. First, one of the violating states is selected for modification (step 531). For some embodiments, violating states closer to the root node (e.g., having smaller depths) are selected for modification first, which may reduce the number of modification iterations required, for example, by modifying fail states prior to modifying their source states. For other embodiments, the violating states may be selected for modification in any order, regardless of their position (e.g., depth) in the search tree.

Then, the success transitions of the selected violating state's fail state are examined to determine whether the fail state includes any success transitions that are not common (e.g., are a subset) of the selected violating state's success transitions (step 532). If not, as tested at step 533, which indicates that the fail state of the selected violating state does not include any success transitions that are not common to the violating state, the failure transition of the selected violating state is replaced with the failure transition of its fail state so that both the selected violating state and its fail state now fail to the same state (step 534).

For some embodiments, if the fail state does not include any success transitions that are not common with the success transitions of the violating state, the failure transition from the violating state is denoted as a redundant failure transition. Redundant failure transitions may be replaced with the failure transition of the fail state because failure from the violating state to the fail state via the redundant failure transition necessarily results in edge failure from the fail state. For example, referring to FIG. 1B, the failure transition 111 from violating state S9 to fail state S1 is a redundant failure transition because S1 does not include any success transitions that are uncommon to the success transitions of state S9. More specifically, if the cursor data is anything other than an "a" at state S9, edge failure results in the failure transition 111 being taken to state S1, which in turn necessary results in edge failure from S1 to the root node S0 via failure transition 110 because S1 has the same success transition set (e.g., "a") as S9.

Conversely, if the fail state of the selected violating state includes one or more success transitions that are not common to the violating state, as tested at step 533, then the non-common success transitions of the fail state are added as new cross edges to the selected violating state (step 535). In terms of state entry modifications, the non-common success fields of the fail state are copied to the state entries of the selected violating states. The addition of the new cross edge(s) to the violating state causes the violating state's failure transition to become a redundant failure transition, which is then replaced with the failure transition of the fail state so that both states now fail to the same state (step 534).

For example, the failure transition 114 from violating state S12 to its fail state S4 is not redundant because S4 includes an "i" success transition to S5 that is not common to the success transitions of state S12. Thus, the addition of an "i" cross edge from S12 to S5 (step 535) causes S12's failure transition 114 to become redundant, which is then replaced by S4's failure transition to S15 so that states S12 and S4 both fail to S15 (step 534).

Next, it is determined whether the fail state of the selected violating state is an output state (step 536). If so, as tested at step 537, the output code of the fail state is added to the selected violating state (step 538), and modification of the violating state is complete. This process is repeated for the designated violating states so that all failure transitions to non-root states have an RPL≧F.

Figure 6A:
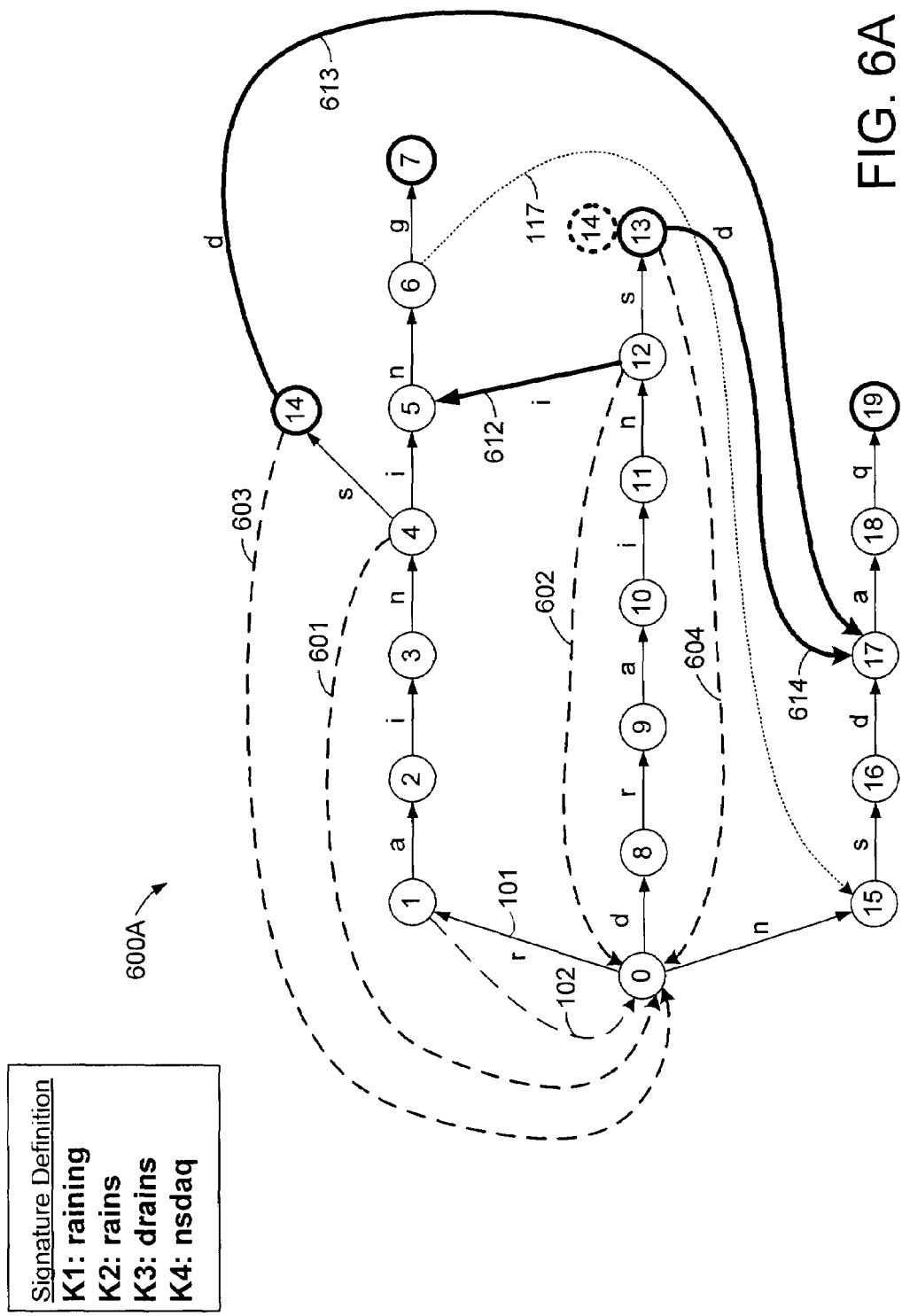
FIG. 6A shows a limited expansion search tree created by modifying the basic AC goto-failure search tree of FIG. 1B to achieve a selected failure size parameter in accordance with some embodiments of the present invention.

Modification of the designated violating states S4 and S9-S14 of the basic goto-failure graph 100B in accordance with the exemplary embodiment described above with respect to the illustrative flow charts of FIGS. 5A-5C creates a limited expansion state graph 600A of FIG. 6A which, as described below, achieves the selected failure-size parameter of F=4. For this example, violating state S4 is chosen for modification first. The fail state of S4 is state S15, which includes an "s" success transition (i.e., to S16) and a failure pointer to the root node S0. Because violating state S4 also includes an "s" success transition (i.e., to S14), the fail state S15 does not include any success transitions that are not common to violating state S4, and thus the success transition set of fail state S15 is a subset of the success transition set of violating state S4. Accordingly, the failure transition 115 from violating state S4 to fail state S15 is redundant, and thus the violating state S4 may be modified by replacing its failure transition 115 with a failure transition 601 to S0 so that S4 and its previous fail state S15 now both fail to the root node S0, as shown in FIG. 6A.

Because the back pointer now moves forward four positions over characters "r," "a," "i," and "n" upon edge failure from state S4 to S0 via failure transition 601, edge failure at state S4 now has an RPL=4=F (e.g., compared to an old RPL=3), and thus state S4 is no longer a violating state. Further, replacing failure transition 115 with failure transition 601 does not increase the memory storage requirements because only the fail state (FS) field of S4's state entry is modified. More specifically, the state entry for S4 in goto-failure graph 100B is {15; i, 5; s,14; 0}, which requires 6 bytes of memory, and the state entry for S4 in graph 600A is {0; i, 5; s, 14; 0}, which also requires 6 bytes of memory. In this manner, redundant failure transitions such as failure transition 115 may be replaced to increase processing speed without increasing memory storage requirements.

Next, violating state S12 is selected for this example. The fail state of S12 is S4, which includes an "s" success transition (i.e., to S14) and includes an "i" success transition (i.e., to S5), as well as a failure pointer to the root node S0. Because violating state S12 does not include an "i" success transition, the fail state S4 includes a success transition that is not common to S12, and thus the success transition set of fail state S4 is not a subset of the success transition set of violating state S12. Thus, in accordance with the present invention, the non-common success transition "i,5" is added to the violating state S12 as "i" cross edge 612, as shown in FIG. 6A. The addition of cross edge 612 results in fail state S4 no longer having any success transitions that are not common to S12, thereby rendering S12's failure transition 114 as redundant. Accordingly, failure transition 114 from S12 to S4 may be replaced by failure transition 602 from S12 to S0 so that S12 and its previous fail state S4 now both fail to the root-node S0.

Because the back pointer now moves forward five positions over characters "d," "r," "a," "i," and "n" upon edge failure from state S12 to S0 via failure transition 602, state S12 now has an RPL=5>F (e.g., compared to an old RPL=1), and thus state S12 is no longer a violating state. The addition of cross edge 612 to S12 requires the addition of one success pointer to S12's state entry, thereby increasing the memory storage area required for STEN12. More specifically, while S12's state entry for goto-failure graph 100B is {4; s,13; 0}, S12's state entry for graph 600A is {0; s,13; i,5;0}, thereby increasing the storage area required for STEN12 from 4 bytes to 6 bytes.

Note that because S4 is the original fail state of S12, and because the failure transition 114 of S12 is ultimately replaced by a failure pointer to the fail state of S4, modifying S4 prior to modifying S12 may, for this example, result in a simpler modification operation. Otherwise, if S12 were modified first, its failure pointer would be replaced by a failure pointer to S15, which is the original fail state of S4. Then, upon subsequent modification of S4, replacing its failure pointer with a failure pointer to S0 (which is the fail state of S15) would require updating the failure pointer of S12 with the new failure pointer of S4.

Next, violating state S14 is selected for this example. The fail state of S14 is state S16, which includes a "d" success transition (i.e., to S17) and a failure pointer to the root node S0. Because violating state S14 does not include a "d" success transition, the fail state S16 includes a success transition that is not common with S14, and thus the success transition set of fail state S16 is not a subset of the success transition set of violating state S14. Thus, in accordance with the present invention, the non-common success transition "d,17" is added to violating state S14 as "d" cross edge 613, as shown in FIG. 6A. The addition of cross edge 613 results in fail state S16 no longer having any success transitions that are not common to S14, thereby rendering S14's failure transition 118 as redundant. Accordingly, failure transition 118 from S14 to S16 may be replaced by failure transition 603 from S14 to S0 so that S14 and its previous fail state S16 now both fail to the root-node S0.

Because the back pointer now moves forward five positions over characters "r," "a," "i," "n" and "s" upon edge failure from state S14 to S0 via failure transition 603, state S14 now has an RPL=5>F (e.g., compared to an old RPL=3), and thus state S14 is no longer a violating state. The addition of cross edge 613 to S14 requires the addition of one success pointer to S14's state entry, thereby increasing the memory storage area required for STEN14. More specifically, while S14's state entry for goto-failure graph 100B is {16; 0; K2}, S14's state entry for graph 600A is {0; d,17; K2}, thereby increasing the storage area required for STEN14 from 3 bytes to 4 bytes.

Next, state S13 is selected for this example. The fail state of S13 is S14, which now includes a "d" success transition (i.e., to S17) and a failure pointer 603 to S0. Because violating state S13 does not include a "d" success transition, the fail state S14 includes a success transition that is not common with S13, and thus the success transition set of fail state S14 is not a subset of the success transition set of violating state S13. Thus, in accordance with the present invention, the non-common success transition "d, 17" is added to violating state S13 as "d" cross edge 614, as shown in FIG. 6A. The addition of cross edge 614 results in fail state S14 no longer having any success transitions that are not common to S13, thereby rendering S13's failure transition 116 as redundant. Accordingly, failure transition 116 from S13 to S14 may be replaced by failure transition 604 from S13 to S0 so that S13 and its previous fail state S14 now both fail to the root node S0.

Because the back pointer now moves forward six positions over characters "d," "r," "a," "i," "n," and "s" upon edge failure from state S13 to S0 via failure transition 604, edge failure at state S13 now has an RPL=6>F (e.g., compared to an old RPL=1), and thus state S13 is no longer a violating state. In addition, because state S13's previous fail state S14 is an output state, the output code of S14 is added to S13 so that state S13 now includes output codes for both K3="drains" and K2="rains," as shown in FIG. 6A. The above-described modifications to state S13 may be implemented by modifying the S13's state entry from {14; 0; K3} to {0; d, 17; K2,K3}, which increases the memory area of STEN13 from 3 bytes to 5 bytes.

Note that because S14 is the original fail state of S13, modifying S14 prior to modifying S13 may, for this example, result in a simpler modification operation for reasons similar to those described above with respect to states S4 and S12.

The remaining violating states S9-S11 have redundant failure transitions 111-113 to states S1-S3, respectively, and therefore may be modified by replacing their failure transitions with failure pointers to the root node S0 (e.g., in a manner similar to that described above with respect to state S4). For example, the fail state of S9 is S1, which fails to the root node S0 and does not have any success transitions that are not common to S9. Thus, state S9 may be modified by replacing its failure transition 111 to S1 with a failure pointer to S0 (not shown for simplicity) so that S9 and its previous fail state S1 now both fail to the same state (e.g., the root node S0). Similarly, state 510 may be modified by replacing its failure transition 112 to S2 with a failure pointer to S0 (not shown for simplicity) so that S10 and its previous fail state S2 now both fail to the same state (e.g., the root node S0). Similarly, state S11 may be modified by replacing its failure transition 113 to S3 with a failure pointer to S0 (not shown for simplicity) so that S11 and its previous fail state S3 now both fail to the same state (e.g., the root node S0). Because the failure transitions of S9-S11 are redundant, and thus only the failure pointers of S9-S11 need to be modified to alleviate their "violating state" designation, modification of the state entries for S9-S11 does not require additional memory storage area.

Modifications to the state entries of the goto-failure state graph 100B of FIG. 1B made in accordance with the exemplary embodiment described above with respect to FIGS. 5A-5C to create the limited expansion state graph 600A of FIG. 6A for F=4 are summarized in Table 230 of FIG. 2D. For simplicity, only the modified states S4 and S9-S14 are shown in Table 230. Note that although the new failure transitions from states S9 and S10 have RPL values that are less than F=4, states S9 and S10 now fail directly to the root node S0, and therefore they are exempt from the violating state designation, for reasons discussed above.

Thus, for the example described above, the processing speed of the basic goto-failure state graph 100B of FIG. 1B may be increased from P=0.5 characters per cycle to a processing speed of P=0.8 characters per cycle, as embodied by the limited expansion graph 600A of FIG. 6A, by adding 3 new cross edges (e.g., cross edges 612-614) and one output code (e.g., the K2="rains" output code to S13) to the state entries for S0-S19, which as described above requires a total of 5 additional bytes of memory storage area. Thus, while the state entries of the basic goto-failure graph 100B of FIG. 1B require 82 bytes of memory (as indicated in Table 210 of FIG. 2B), the state entries for the limited expansion state graph 600A of FIG. 6A require 82+5=87 bytes of memory. Accordingly, for this example, embodiments of the present invention may increase the worst-case processing speed of a string search engine configured to search input strings for signatures K1=K4 by 0.8/0.5=60% with a storage area increase of only 88/82=7.3%. Thus, by selecting the worst-case failure size (F) parameter that results in a desired worst-case processing speed and modifying the search tree accordingly, embodiments of the present invention may achieve significant speed improvements with only a slight increase in storage area requirements. In this manner, embodiments of the present invention allow a user to determine how much storage area is available, and then selectively modify a search tree to maximize the processing speed for the given amount of storage area.

For other embodiments, the redundant failure transitions of the basic goto-failure graph may be modified first (e.g., before RPL calculations are used for violating state designations), which increases processing speed without increasing memory storage requirements. For example, referring to the illustrative flow chart 530 of FIG. 5D, for other embodiments, any redundant failure transitions of the basic goto-failure graph are modified first (step 503a(1)). Next, the RPL values of the basic goto-failure graph's failure transitions are calculated (step 503a(2)), and each state with a failure transition having an RPL less than the selected F parameter value is designated as a violating state (step 503b). The violating states that fail directly to the root node are exempted (step 503c), and then the state information for the remaining violating states are modified so that all failure transitions to non-root states have an RPL value that is greater than or equal to the selected F parameter (step 503d). Note that for embodiments in which the redundant failure transitions are modified first, as depicted in the illustrative flow chart 530 of FIG. 5D, modification of all states that are subsequently designated as violating states may require the addition of non-common success transitions of corresponding fail states (e.g., as performed at step 535 in flow chart 530).

Although an exemplary embodiment for selectively modifying a search tree to increase its F parameter to a selected value is described above with respect to F=4, it is to be understood that embodiments of the present invention may be used to increase the F parameter of a suitable search tree to any selected value.

Figure 6B:
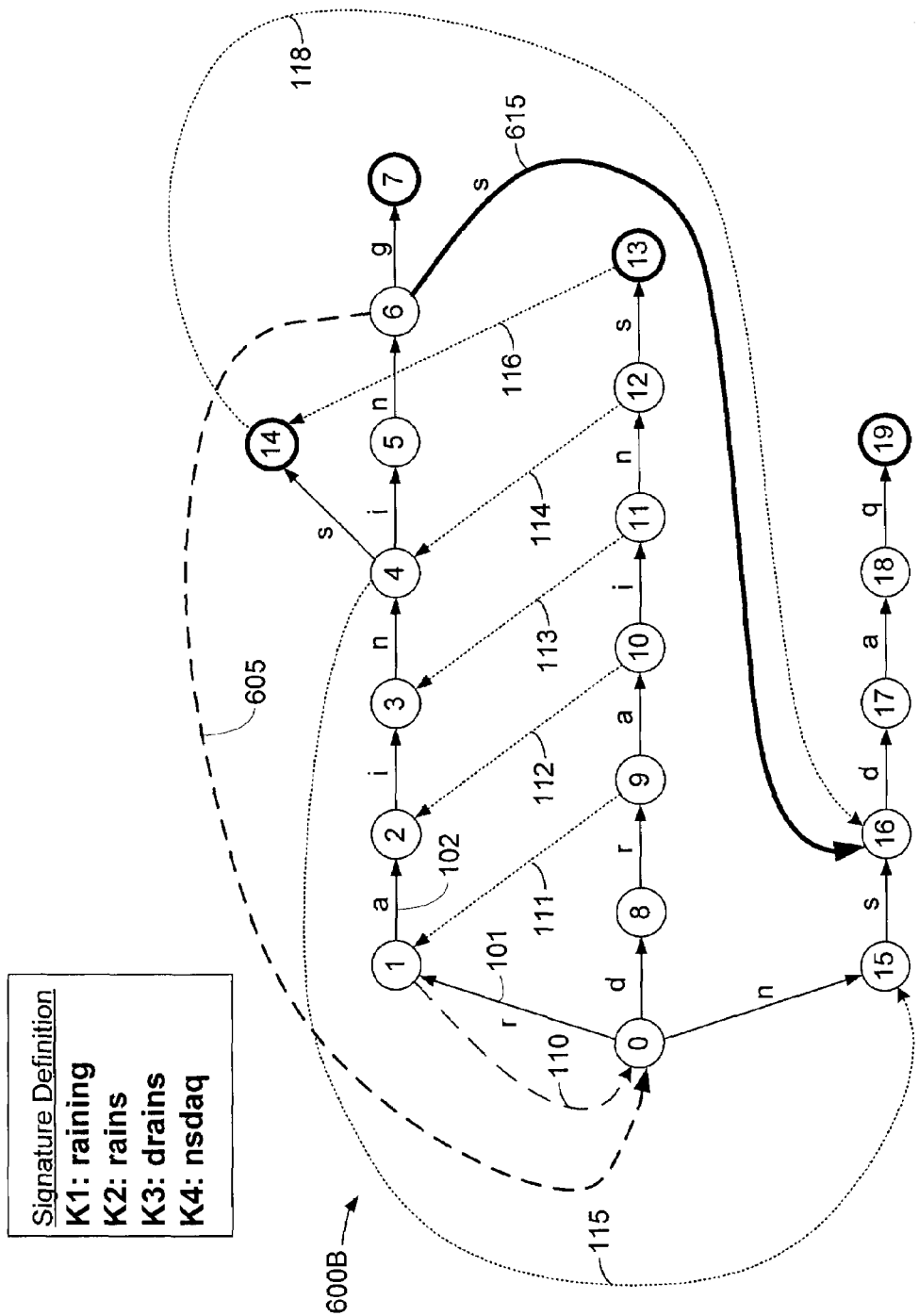
FIG. 6B shows a limited expansion search tree created by modifying the basic AC goto-failure search tree of FIG. 1B to achieve a selected failure size parameter in accordance with another embodiment of the present invention.

Further, for other embodiments, one or more states of a basic goto-failure graph may be individually selected for modification in accordance with the present invention (e.g., without selecting a F parameter that results in a worst-case processing speed), and/or subsequent to an F parameter optimization operation described above with respect to FIGS. 5A-5C. For example, referring to FIG. 1B, the state entry for state S6 may be individually selected for modification in accordance with the present invention (e.g., without regard to selecting an F parameter value) as follows. The fail state of S6 is S15, which includes an "s" success transition (i.e., to S16) and a failure transition to the root node S0. Because state S6 does not include an "s" success transition, the fail state S15 includes a success transition that is not common with S6, and thus the success transition set of fail state S15 is not a subset of the success transition set of state S6. Thus, in accordance with the present invention, the non-common success transition "s, 16" may be added to state S6 as "s" cross edge 615, and the failure transition 117 from S6 to S15 maybe replaced by a failure transition 605 from S6 to S0 (which is the fail state of S15), as shown in FIG. 6B.

Referring again to FIG. 3A, the state memory 320 that stores state entries (e.g., for states S0-S19 of the search trees 100) may be a random access memory (RAM) such as a static RAM (SRAM) or dynamic RAM (DRAM), or may be a non-volatile memory such as ROM, EEPROM, or flash memory. For other embodiments, search engine 300 may be implemented using a ternary CAM (TCAM) device, a hash-based search engine, or a tree-based search engine. In one particular embodiment, a NSE5512 or NSE5526 ternary CAM available from NetLogic Microsystems, Inc. may be used for the search engine. Alternatively, other search devices from NetLogic Microsystems, Inc. or from other vendors may be used.

As mentioned above, the processing speed of the string search engine may also be improved by increasing the value of the S parameter of a given search tree. In accordance with some embodiments of the present invention, the processing speed of a search tree such as the basic AC goto-failure state graph may be increased by applying path compression techniques to create a path-compressed search tree that allows multiple characters to be traversed on some success transitions. Path compression involves concatenating linear (i.e., non-branching) sequences of state transitions into a single state transition with the sequence of data values that formerly formed the success transitions in the sequence of states concatenated into a string that forms the success transition in the unified state transition, which reduces the number of nodes from W*N relative to the basic Aho-Corasick scheme depicted in FIG. 1B to a worst-case 2N nodes (i.e., where each new signature requires the addition of at most two nodes as when an existing path-compressed node is changed into a branch node plus two path-compressed nodes, thereby reducing the number of nodes by the factor W/N).

More specifically, path compression techniques in accordance with present embodiments allow selected groups of states of a search tree to be compressed into corresponding single states that represent multiple characters of the signature definition. In this manner, the value of the success-size (S) parameter may be increased, which increases processing speed. Further, increasing the S parameter may reduce the number of states of the search tree, which in turn may reduce memory storage requirements of the search tree.

A second embodiment of the present invention for selectively optimizing a given basic goto-failure state graph to create path-compressed state graph by modifying the graph's state information to achieve a selected success-size parameter S is described below with respect to the illustrative flow charts of FIGS. 7A-7C. Note that although described below and shown in the Figures in an exemplary order, for other embodiments, the steps of the flow charts of FIGS. 7A-7C may be performed in other orders.

First, referring now to FIG. 7A, a desired worst-case processing speed to be achieved by a FSM implementing search operations between an input string and the signatures is specified (step 701). Then, the failure-size (F) parameter of the given search tree is determined (step 702). For this example, the basic AC goto-failure graph 100B of FIG. 1B is selected, which as described above has F=1.

Next, a value of the S parameter is selected (e.g., calculated) that will result in a desired minimum or worst-case processing speed, for example, where $$S = \frac{F*P}{F-P}$$

(step 703). For this example, the success size parameter is selected to be S=2, which achieves a worst-case processing speed of $$P = \frac{Y}{Y/S + Y/F} = \frac{S*F}{S+F} = 2*1/(2+1) = 0.67$$

characters per cycle.

Then, the basic state graph is selectively modified (e.g., compressed) in accordance with the present invention to create a path-compressed state graph that allows a string search operation to process up to S characters of an input string at a time (step 704). An exemplary path compression technique in accordance with embodiments of the present invention is described below with respect to the illustrative flow chart 720 of FIG. 7B.

First, each sequence of S states of a signature branch or path beginning at the root node is combined (e.g., compressed) into a single core state representing S data values (step 704a). For example, starting with the basic goto-failure graph 100B of FIG. 1B, states S1 and S2 are compressed into state S2 which is reached by the 2-character success transition "ra" from S0 (e.g., and where S2 represents the matching prefix "ra"), states S3 and S4 are compressed into state S4 which is reached by the 2-character success transition "in" from S2 (e.g., where S4 represents the matching prefix "rain"), and so on, as depicted by the path-compressed state graph 800A of FIG. 8A. In this manner, a string search engine operating according to the path-compressed state graph 800A of FIG. 8A may process up to S=2 characters per search cycle. For example, if the first two input characters detected at S0 are "ra," then the search engine transitions to S2 via the "ra" success transition. Then, if the next two input characters are "in," then the string search engine transitions to S4 via the "in" success transition.

Figure 8A:
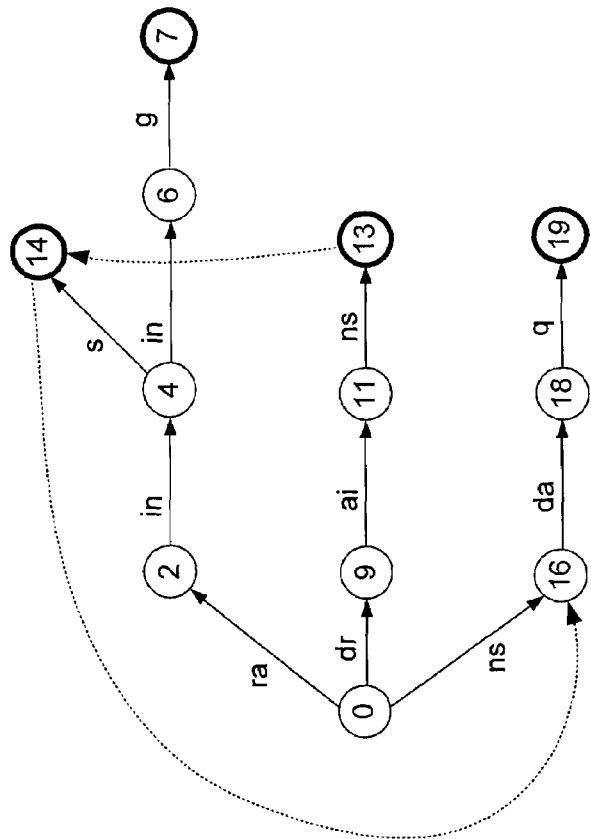
FIG. 8A shows a path compressed search tree created by modifying the basic AC goto-failure search tree of FIG. 1B to achieve a selected success size parameter in accordance with some embodiments of the present invention.

Note that when forming the path-compressed state graph 800A of FIG. 8A, if any particular signature is of a length that is not evenly divisible by the selected S parameter value, then the success transition between the last compressed state and the output state of the corresponding signature branch may represent less than S data values. For example, referring to FIG. 8A, because the signature K2="rains" includes 5 characters and is thus not evenly divisible by S=2 (e.g., 5/2 results in a remainder of 1), the success transition between the last compressed state S4 and the output state S14 of the K2 signature path represents only one data character (e.g., the "s" success transition).

For purposes of discussion herein, the compressed states and output states that form the resulting compressed state graph may be referred to herein as original or core states of the path-compressed state graph. For example, states S0, S2, S4, S6, S7, S9, S11, S13, S14, S16, S18, and S19 are referred to herein as core states of path-compressed state graph 800A. Thus, for this example, path compression of the basic goto-failure graph 100B of FIG. 1B results in the initial elimination of states S1, S3, S5, S8, S10, S12, S15, and S17, as shown in FIG. 8A.

Further, for some embodiments, the failure transitions between the core states of the path-compressed state graph are retained. Thus, for this example, the failure transition from S13 to S14 and the failure transition from S14 to S16 are retained, as depicted by the dotted lines in FIG. 8A.

Next, referring again to FIG. 7B, the fail state of each core state of the path-compressed state graph that was eliminated during the path-compression operation of step 704a is restored (step 704b). For this example, states S1, S3, and S15, which are the fail states of original states S9, S11, and S4 and S6, respectively, of path-compressed state graph 800A of FIG. 8A, are restored to form a modified path-compressed state graph 800B of FIG. 8B. The restored fail states S1, S3, and S15 are shown as dashed circles in FIG. 8B. Note that the fail states of any intermediate states that were eliminated during path compression are not restored because those intermediate states do not exist in the newly formed path-compressed state graph. For example, referring to FIG. 1B, state S2, which is the fail state S10, is not restored because S10 does not exist in the path-compressed state graph 800A of FIG. 8A (e.g., states S10 and S11 are compressed into core state S11 in the path-compressed state graph 800A of FIG. 8A).

Then, failure transitions are restored (e.g., inserted) between the core states of the path-compressed state graph and their corresponding restored fail states (step 704c). For this example, the failure transition from core state S9 to restored fail state S1 is restored, the failure transition from core state S11 to restored fail state S3 restored, and the failure transitions from core states S4 and S6 to restored fail state S15 is restored. These restored failure transitions are shown as bold dashed lines in FIG. 8B.

Then, a success transition having up to S characters is inserted from each restored fail state to the nearest core state so that a success path exists between each of the restored fail states and one or more corresponding output states (step 704d). For this example, a 1-character success transition "a" is inserted from restored fail state S1 to core state S2, a 1-character success transition "n" is inserted from restored fail state S3 to core state S4, and a 1-character success transition "s" is inserted from restored fail state S15 to core state S16 (the inserted cross success transitions are shown as bold lines in FIG. 8B).

Finally, any cross edges from core states to states that were eliminated during path compression are modified so that the cross edges now transition to states that are present in the path-compressed search tree (step 704e). For the present example, there are no such cross edges.

Thereafter, one or more of steps 704a-704e may be repeated, as necessary, to ensure that edge failure at any of the states in the path-compressed state graph results in a direct failure to a corresponding fail state that is present in the path-compressed search tree. More specifically, for each state restored in steps 704b and 704c, the corresponding fail state must also be restored (if not already existing) to enable direct edge failure. This process is repeated until there are no more eliminated fail states.

Restoring the fail states of the core states of the path-compressed state graph prevents edge failure to states that were eliminated during path compression, which would otherwise undesirably require rewinding the cursor upon such failures. For example, if fail state S15 is not restored to the path-compressed state graph of FIG. 8B, then edge failure at state S6 (e.g., which occurs if the cursor data does not match the success transition "g" from S6 to S7) would require failure to state S0 and rewinding the cursor by one position so that the matching input character "n" is re-examined at S0 (e.g., for a possible match with the "ns" success transition to S16). In contrast, for the modified path-compressed state graph 800B of FIG. 8B, edge failure at S6 results in failure to restored fail state S15 (which represents the matching prefix "n"), and the next input character may be examined (e.g., without rewinding the cursor) to find a match with the "s" cross edge to S16.

As mentioned above, increasing the value of the S parameter of a search tree using path compression techniques in accordance with the present invention may not only increase processing speed but also may reduce the number of states in the search tree and thus may reduce the memory area required to store the tree's state entries. For this example, the path-compressed state graph 800B of FIG. 8B allows a string search engine to examine up to S=2 input characters at a time, and thus may achieve a worst-case processing speed of 0.67 characters per cycle, as discussed above. Further, because states S5, S8, S10, S12, and S17 are eliminated from the path-compressed state graph 800B of FIG. 8B, as compared to the basic goto-failure state graph 100B of FIG. 1B, the state memory does not need to store the state entries for S5, S8, S10, S12 and S17, which as indicated in Table 210 of FIG. 2B collectively requires 20 bytes of memory. Accordingly, for this example, applying path compression techniques of the present invention to the goto-failure graph 100B to create the path-compressed state graph 800B of FIG. 8B increases the worst-case processing speed by up to approximately 0.67/0.5=34% while decreasing memory storage requirements by up to approximately 82/(82−20)=82/62=32%. For search trees that embody signatures having less failover pointers than signatures K1-K4 (e.g., signatures having less numbers of common prefixes), path compression techniques in accordance with the present invention may reduce the number of states by as much as a factor of S.

Referring again to FIG. 7A, for some embodiments, after the path compression technique is applied to the basic goto-failure graph, any redundant failure transitions may be eliminated (step 705). The removal of redundant failure transitions from the path-compressed state graph is described in more detail below with respect to FIGS. 10A-10C.

For the embodiments described above with respect to FIGS. 7B and 8B, the cross edges inserted between the restored fail states and the nearest core states may include less than S success characters. For example, the cross edge inserted between restored fail state S1 and core state S2 includes a 1-character success transition "a." For some search trees, processing speeds may be maximized by providing as many S-character cross edges from restored fail states to core states. For example, the 1-character cross edge "a" from restored fail state S1 to core state S2 may be replaced by a 2-character success transition "ai" from restored fail state S1 to restored fail state S3, as shown in FIG. 8C.

Although an exemplary embodiment for selectively compressing a search tree to increase its S parameter to a selected value is described above with respect to S=2, it is to be understood that embodiments of the present invention may be used to increase the S parameter of a suitable search tree to any selected value.

For some embodiments, when creating a path-compressed state graph from a given basic goto-failure graph, a search tree bitmap may be created that includes an inclusion bit for each state in the search tree, wherein assertion of the inclusion bit indicates that the corresponding state is to be included in the path-compressed state graph, and wherein de-assertion of the inclusion bit indicates that the corresponding state is not to be included in the path-compressed state graph. Initially, the inclusion bits for all states in the basic goto-failure graph are de-asserted. Then, referring again to the illustrative flow chart of FIG. 7B, the inclusion bit for each state that is eliminated during the path compression operation of step 704a is de-asserted. Next, the inclusion bit for each state restored during the operation of step 704b is asserted. Thereafter, the resulting state bitmap may be used to create the path-compressed state graph.

As described above with respect to FIG. 2A, the state entries for search trees typically include a fail state (FS) field 201, a success field 202, and an output code (OC) field 203. During search operations between an input string and a number of signatures embodied by a search tree, a string search engine transitions between states in response to success transitions and edge failures, as described above. More specifically, at any given state of the search tree, the corresponding state entry is accessed (e.g., read from the state memory), and the search engine compares up to S characters of the input string to the success characters extracted from the success field 202 of the corresponding state entry.

However, for search trees in which S>1, compare operations at some states may require the string search engine to examine less than S characters of the input string at a time. For example, referring to the S=2 path-compressed state graph 800B of FIG. 8B, while a search engine may compare S=2 input characters with the success transitions at many states that have 2-character success transitions (e.g., such as state S2), the search engine may need to compare only one input character at other states that have 1-character success transitions (e.g., such as state S6). Further, for still other states, such as state S4, the search engine may be required to initially compare 2 input characters to find a match with a corresponding 2-character success transition (e.g., the "in" success transition from S4 to S6), and if there is edge failure, to then compare 1 input character to find a match with a corresponding 1-character success transition (e.g., the "s" success transition from S4 to S14). For this last example, if the input character search size is not reduced from 2 to 1 and another compare operation is not performed at S4 upon mismatch with the 2-character success transition "in" at S4, a potential match with the "s" success transition to output state S14 may be undesirably skipped, which in turn may preclude determination of a match with the signature K2="rains." Therefore, for some string search operations using path-compressed search trees, there is a need to selectively perform iterative compare operations between overlapping substrings of an input string and the signatures embodied by the search tree.

Thus, in accordance with some embodiments of the present invention, a string search engine may employ a next search size (NSS) bitmap to determine how many input characters are to be initially compared with the success transitions at the associated state of the search tree, and if the compare operation results in edge failure, whether to compare one or more groups of fewer input characters (e.g., overlapping substrings of the input string) to the success transitions at the associated state during one or more successive compare operations. More specifically, in accordance with some embodiments of the present invention, each state entry of a search tree having S>1 may include a corresponding entry of an NSS bitmap that not only allows the number of input characters initially compared with the success transitions at a given state to be dynamically adjusted, but also allows for one or more subsequent iterative compare operations between decreasing numbers of input characters (e.g., overlapping substrings of decreasing size) and the success transitions upon initial mismatch results at a given state.

For example, FIG. 9A shows an exemplary NSS bitmap entry 900 that, in accordance with some embodiments of the present invention, may be included within each of the state entries for path-compressed state graphs having S>1. NSS bitmap entry 900 is shown to include S bits NSS[1]-NSS[S], where each NSS bit indicates whether a corresponding string length of input characters is to be compared with the success characters at the associated state in the search tree during successive compare operations.

For some embodiments, a bit position of each NSS bit in the bitmap entry indicates how many of the input characters are to be included in the corresponding substring of the input string. For one embodiment, the NSS bits are arranged within each bitmap entry according to decreasing substring lengths, for example, so that the first bit NSS[S] in the bitmap entry indicates whether a first substring including S of the input characters are to be compared at the associated state, the second bit NSS[S-1] in the bitmap entry indicates whether a second substring including S-1 of the input characters are to be compared at the associated state, and the last bit NSS[ ] in the bitmap entry indicates whether a last substring including 1 of the input characters is to be compared at the associated state. In this manner, the NSS bitmap allows iterative compare operations to be performed to implement a longest prefix match at a given state of the search tree.

For example, for a bitmap entry 900 having S=2 bits NSS [2] and NSS[1], NSS[2] is positioned as the first bit in the bitmap entry and indicates whether a first substring including 2 of the input characters are to be compared with the success transitions at the associated state in a first compare operation, and NSS[1] is positioned as the second bit in the bitmap entry and indicates whether a second substring including 1 of the input characters is to be compared at the associated state in a second compare operation. For some embodiments, the first and second substrings overlap such that the second substring is a subset of the first substring, as described in more detail below with respect to FIG. 9D. Thus, for some embodiments, the overlapping substrings of the input string all include at least one common input character. Further, for some embodiments, if a compare operation at the current state results in a match, the matching success transition is taken to the next state, and subsequent compare operations at the state are not performed. Conversely, if a compare operations results in a mismatch, then a next compare operation using a substring including fewer input characters may be performed if its corresponding NSS bit is asserted.

For some embodiments, an asserted (e.g., to logic 1) NSS bit indicates that an associated substring of a corresponding string length is to be compared at the associated state, and a de-asserted (e.g., to logic 0) NSS bit indicates that the associated substring is not to be compared at the associated state.

Figure 8B:
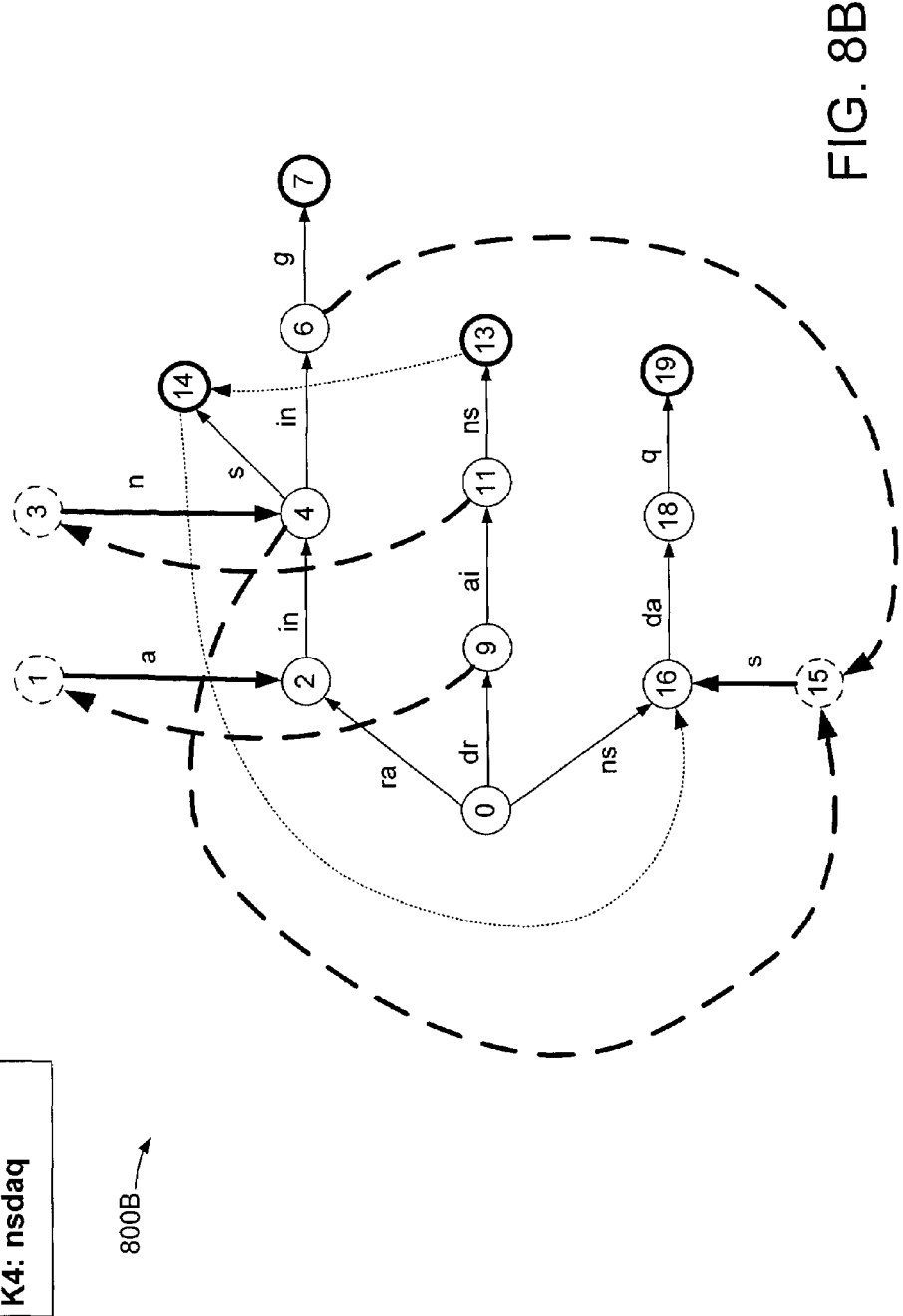
FIG. 8B shows further modifications to the path compressed search tree of FIG. 8A in accordance with some embodiments of the present invention.
Figure 8C:
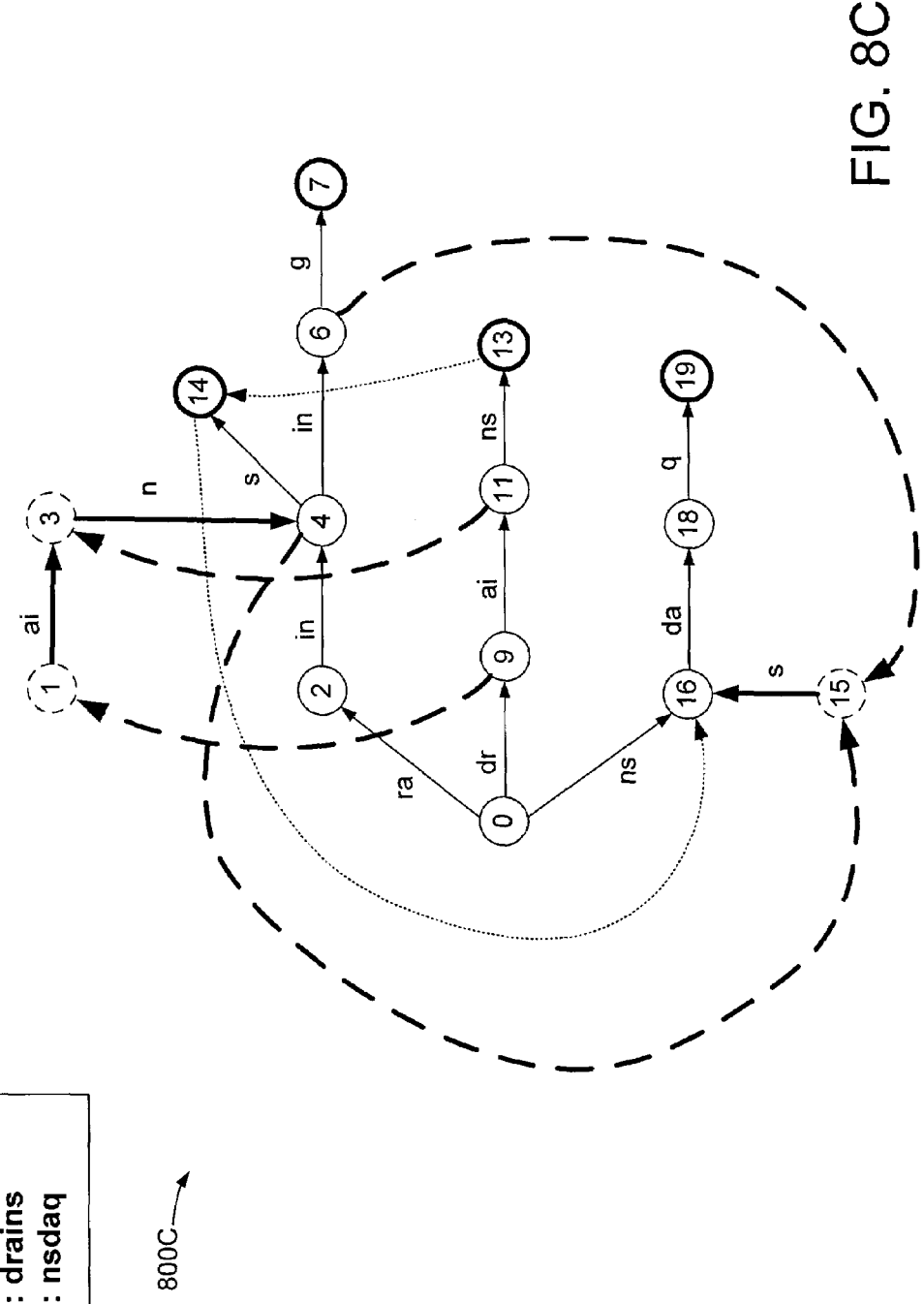
FIG. 8C shows further modifications to the path compressed search tree of FIG. 8A in accordance with other embodiments of the present invention.

FIG. 9B shows an NSS bitmap 910 including 2-bit entries for states S0-S4, S6-S7, S9, S11, S13-S16, and S18-S19 of the path-compressed state graph 800B of FIG. 8B. For one example, the NSS bitmap entry for state S2 includes NSS[2] =1 and NSS[1]=0. The first bit NSS[2]=1 instructs the string search engine to examine a first input substring including 2 input characters in a first compare operation at state S2 (e.g., for a possible match with the 2-character success transition "in" to S4), and the second bit NSS[1]=0 instructs the search engine to not examine a second input substring including 1 input character in a second compare operation if the first compare operation results in edge failure.

For another example, the NSS bitmap entry for state S4 includes NSS[2]=1 and NSS[1]=1. The first bit NSS[2]=1 instructs the string search engine to examine a first substring including 2 input characters in a first compare operation at state S4 (e.g., for a possible match with the 2-character success transition "in" to S6), and the second bit NSS[1]=1 instructs the search engine to examine a second substring including 1 input character in a second compare operation (e.g., for a possible match with the 1-character success transition "s" to S14) if the first compare operation results in edge failure.

For yet another example, the NSS bitmap entry for state S6 includes NSS[2]=0 and NSS[1]=1. The first bit NSS[2]=0 instructs the search engine to not compare a first substring including 2 input characters at state S6, and the second bit NSS[1]=1 instructs the search engine to compare a second substring including 1 input character in the first compare operation at state S6 (e.g., for a possible match with the 1-character success transition "g" to S7).

Further, note that both bits of the NSS entries for states S7, S13, S14, and S19 in bitmap 910 are de-asserted (e.g., to logic 0) because no input characters are examined at those states, as indicated in the search tree 800B of FIG. 8B.

For some embodiments, the individual NSS bitmap entries (e.g., as generally indicated by NSS bitmap entry 900 of FIG. 9A) may be stored in corresponding state entries for the various states of the search tree. For other embodiments, the NSS bitmap for a search tree (e.g., such as bitmap 910) may be stored as a bitmap (e.g., as a unified data table apart from the individual state entries of the search tree) in a suitable memory element. For example, referring also to FIG. 3A, the NSS bitmap may be stored in a dedicated memory (not shown for simplicity) accessible by search logic 310 and/or may be stored in a separately allocated portion of the state memory 320. For one embodiment, the NSS bitmap may be stored in a memory element (not shown for simplicity) provided within the search logic 310 (e.g., to avoid memory access latencies associated with state memory 320). For such embodiments, compare logic 314 may be employed to selectively perform iterative compare operations between success transitions (e.g., or other suitable searchable patterns) and a number of overlapping substrings of an input string according to the NSS bits and/or match results of previous compare operations, as described in more detail below.

Figure 9C:
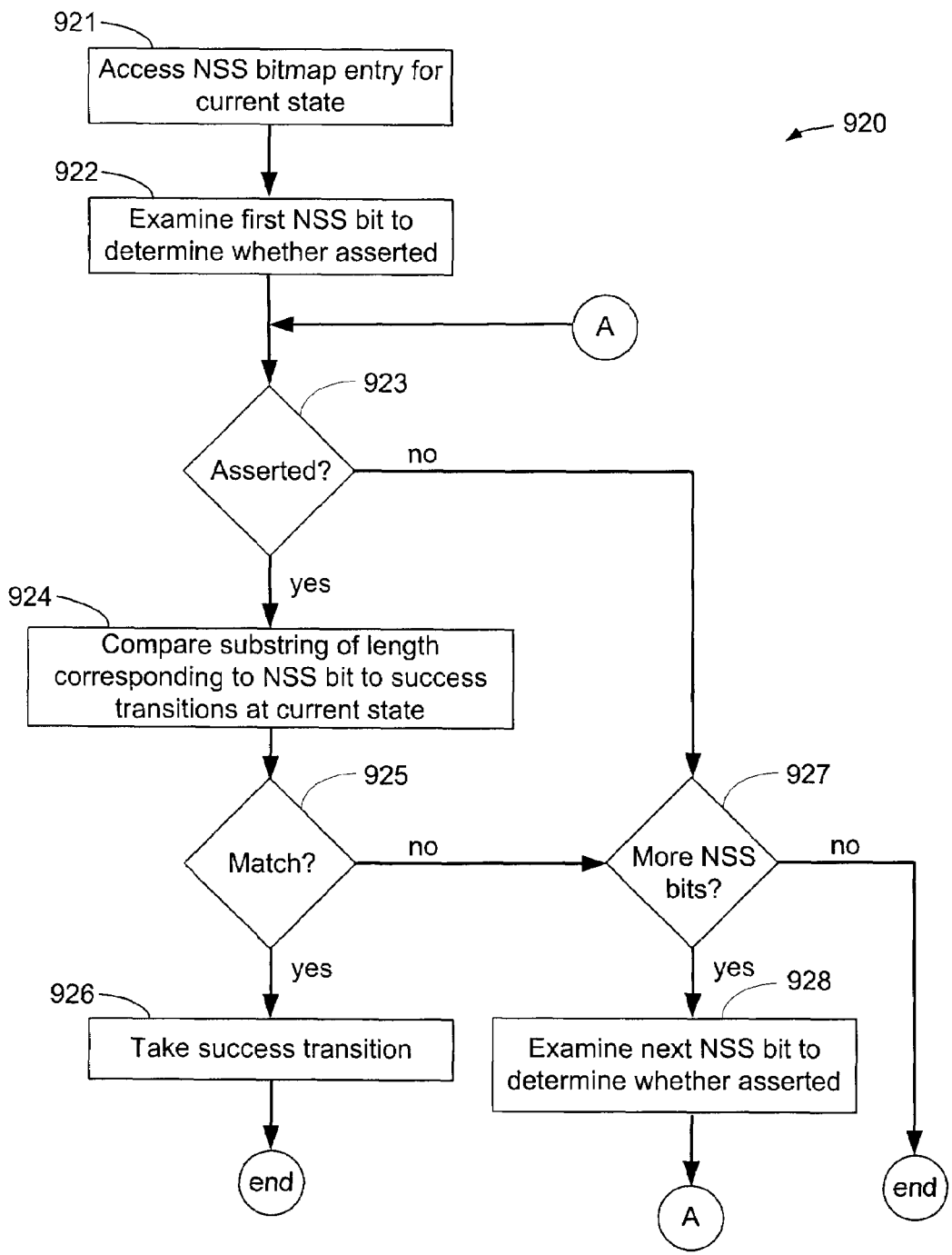
FIG. 9C shows an illustrative flow chart depicting an exemplary search operation employing the next success size bitmap of FIG. 9B.

An exemplary search operation employing the NSS bitmap 910 of FIG. 9B during string search operations performed according to the path-compressed state graph 800B is described below with respect to the illustrative flow chart 920 of FIG. 9C. At any given current state in the S=2 search tree 800B, a string search engine first accesses the NSS bitmap entry for the current state (step 921).

For purposes of discussion herein, an un-examined portion of an input string 930 at the current state is depicted in FIG. 9D, where CHAR[1] is the first unexamined character of the input string (e.g., as indicated by the cursor), CHAR[2] is the next unexamined character of the input string, and so on, where CHAR[n] is the $n^{th}$ unexamined character of the input string.

Then, the string search engine examines the first NSS bit of the bitmap entry for the current state (step 922). If the NSS bit is asserted, as tested at step 923, the string search engine compares a first substring of the input string with the success transitions of the current state in a first compare operation (step 924). Because the first NSS bit read from the S=2 bitmap entry is NSS[2], which has a bit position of 2 and thus corresponds to an input substring length L=2, the first substring 931 includes the first two unexamined characters CHAR[1] and CHAR[2] of the input string 930, as depicted in FIG. 9D.

If there is match between the first substring and one of the success transitions at the current state, as tested at step 925, the string search engine takes the matching success transition to the next state (step 926). For example, referring to the search tree of FIG. 8B, if at state S4 the first substring 931 includes input characters "in," then the matching "in" success transition is taken to S6.

Conversely, if there is not a match between the first substring and one of the success transitions at the current state, as tested at step 925, and if there are additional (e.g., un-examined) bits in the NSS bitmap entry, as tested at step 927, the next bit in the NSS bitmap entry is examined (step 928), and processing continues at step 923. Because the next NSS bit read from the bitmap entry is the second bit NSS[1], which has a bit position of 1 and thus corresponds to an input substring length L=1, the second substring 932 includes the first unexamined character CHAR[1] of the input string 930, as depicted in FIG. 9D.

Note that the second substring 932 includes one less unexamined input character than the first substring 931, and both the first and second substrings include the first unexamined input character CHAR[1]. As a result, the second substring 932 is a subset of the first substring 931. Thus, for some embodiments, the second substring may be formed by removing the last input character from the first substring.

If there is a match between the second substring and one of the success transitions at the current state, as tested at step 925, the string search engine takes the matching success transition to the next state (step 926). For example, if at state S4 the second substring 932 includes input character "s," then the matching "s" success transition is taken to S14. Otherwise, if there is a mismatch, processing continues at step 927. If there are no more (e.g., un-examined) bits in the current NSS bitmap entry, as tested at step 927, iterative compare operations at the current state ends, and the failure transition is taken to the fail state of the current state.

Further, if the first NSS bit examined at step 922 is not asserted, as tested at step 923, then the associated first substring (e.g., substring 931 including CHAR[1] and CHAR[2]) is not compared with the success transitions at the current state, and processing continues at step 927 so that if the second NSS bit is asserted, then the second substring (e.g., substring 932 including CHAR[1]) is compared with the success transitions at the current state. For example, because NSS[2]=0 and NSS[1]=1 for state S6, the string search engine does not compare the first substring 931 (e.g., including two input characters) to the success transitions at S6, but rather only compares the second substring 932 (e.g., including one input character) to the success transitions at S6.

In addition, although described above with respect to string search operations between a plurality of signatures and an input string using a path-compressed search tree, for other embodiments, the NSS bitmaps described above may be used for selectively performing iterative compare operations between any searchable pattern and a number S of overlapping substrings of an input string. For these other embodiments, a bitmap having S next search size (NSS) bits is provided, wherein each NSS bit indicates whether an associated substring that includes a corresponding unique number of the input characters is to be compared with the searchable pattern in successive compare operations. Then, the successive compare operations are selectively performed in response to the NSS bits and/or the match results of previous compare operations.

As described above with respect to FIG. 4, the worst-case processing speed of a basic AC goto-failure state graph such as graph 100B of FIG. 1B may be improved by modifying the state graph to become characterized by a selected failure-size (F) parameter and success-size (S) parameter pair. When modifying the basic goto-failure graph to achieve a selected pair of F and S parameters, the state entry modification and path compression techniques described above may be performed in any suitable order. Thus, for some embodiments, path compression techniques (e.g., as described above with respect to the flow charts of FIGS. 7A and 7B) may be applied to the basic goto-failure graph to increase the S parameter of success transitions, and thereafter the state entries of the resulting path-compressed state graph may be modified to increase the F parameter of failure transitions (e.g., as described above with respect to the flow charts of FIGS. 5A-5D). For example, referring again to the path compression operation illustrated in FIG. 7B, the redundant failure transitions of path-compressed state graph 800B of FIG. 8B may be eliminated to further increase the worst-case processing speed, and in some applications, may also reduce memory storage requirements (step 705).

Figure 10A:
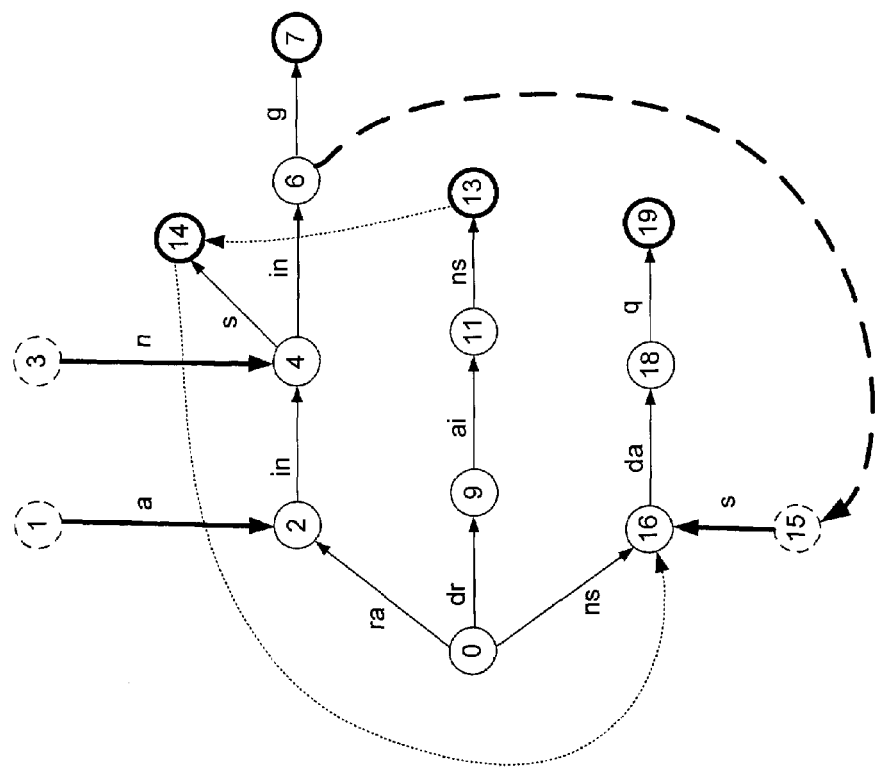
FIG. 10A shows a modified search tree created by eliminating redundant failure transitions from the path-compressed search tree of FIG. 8B in accordance with some embodiments of the present invention.

More specifically, referring again to FIG. 8B, the redundant failure transition from S9 to S1 may be eliminated and replaced with a failure transition from S9 to S0, the redundant failure transition from S11 to S3 may be eliminated and replaced with a failure transition from S11 to S0, and the redundant failure transition from S4 to S15 may be eliminated and replaced with a failure transition from S4 to S0, as depicted in the modified path-compressed state graph 1000A of FIG. 10A (for simplicity, the replacement failure transitions from states S9, S11, and S4 to the root node S0 are not shown in FIG. 10A). The elimination of these redundant failure transitions increases the RPL values associated with states S9, S11, and S4, thereby increasing the worst-case processing speed.

Figure 10B:
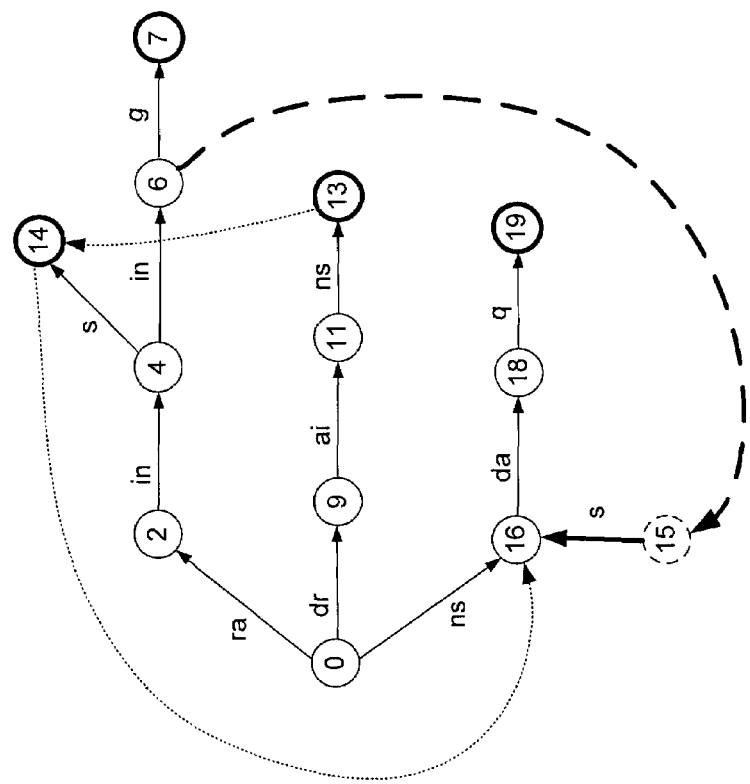
FIG. 10B shows a modified search tree created by eliminating restored fail states associated with the redundant failure transitions eliminated in the creation of the search tree of FIG. 10A in accordance with the present invention.

Further, because there are no longer any failure transitions to the previously restored fail states S1 or S3, states S1 and S3 are no longer fail states for any of the core states of the path-compressed state graph 800B, and therefore may be eliminated, as shown in FIG. 10B. Eliminating states S1 and S3 reduces the number of nodes in the path-compressed state graph 1000B of FIG. 10B, as compared to the path-compressed state graph 800B of FIG. 8B, and thus also reduces the number of state entries required to represent the search tree.

Figure 10C:
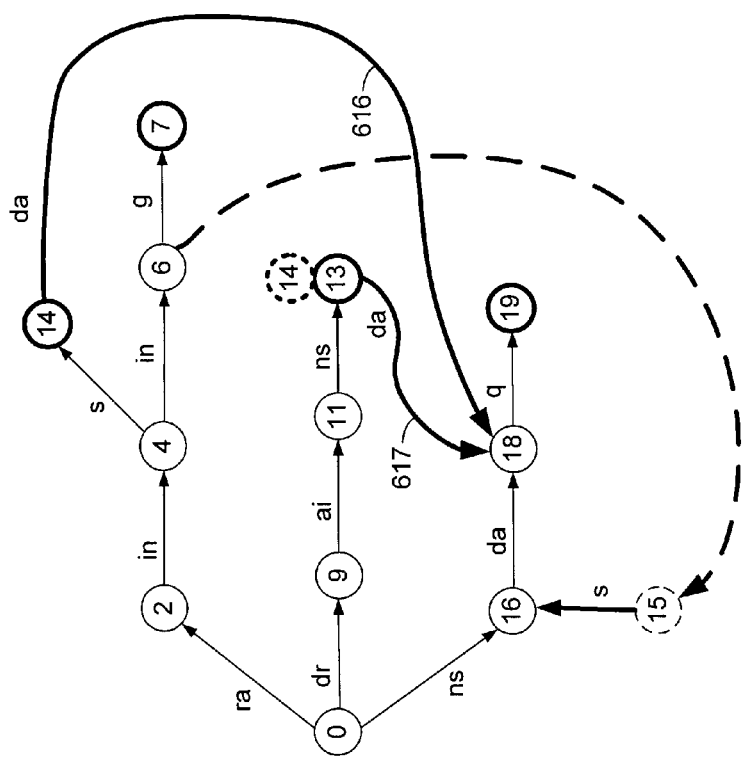
FIG. 10C shows further modifications to the search tree of FIG. 10B that further increase the failure size parameter of the search tree in accordance with the present invention.

Other aspects of the failure-size (F) parameter optimization techniques described above with respect to the flow charts of FIGS. 5A-5D may be applied to path-compressed state graphs created in accordance with present embodiments to further increase worst-case processing speeds. For example, the F parameter optimization techniques described above may be employed to increase the RPL values associated with states S13 and S14 of the path-compressed state graph 1000B of FIG. 10B. More specifically, because S16 (which is the fail state of S14) fails to S0 and includes a success transition "da" to S18 that is not common with the success transitions of S14, the RPL value of the failure transition from S14 may be increased from RPL=3 to RPL=5 by adding a new S=2 cross edge "da" 616 from S14 to S18 and replacing the failure transition from S14 to S16 with a new failure transition from S14 to S0 (not shown for simplicity), as depicted in FIG. 10C. Then, because S14 (which is the fail state of S13) fails to S0 and includes a success transition "da" to S18 that is not common with the success transitions of S13, the RPL value of the failure transition from S13 may be increased from RPL=1 to RPL=6 by adding a new "da" cross edge 617 from S13 to S18, replacing the failure transition from S13 to S14 with a new failure transition from S13 to S0 (not shown for simplicity), and adding the output code of S14 to S13, as depicted in FIG. 10C.

Figure 11A:
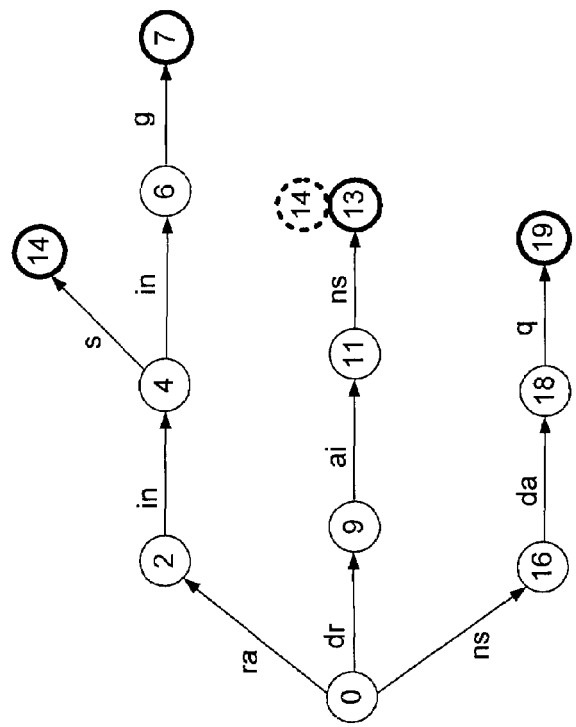
FIG. 11A shows a modified search tree created by applying path compression techniques to the limited expansion search tree of FIG. 6A to increase the success size parameter in accordance with some embodiments of the present invention.

For other embodiments, the basic goto-failure search tree embodying a number of signatures may be first modified to increase the failure-size parameter F, and then subsequently modified to increase the success-size parameter S. More specifically, the failure and/or success transitions of the basic goto-failure graph may be modified first to create a limited expansion state graph having an increased F parameter value (e.g., using the optimization operations described above with respect to the flow charts of FIGS. 5A-5D), and then path compression techniques (e.g., described above with respect to the flow charts of FIGS. 7A-7B) may be applied to the limited expansion state graph to create a path-compressed state graph having an increased S parameter value. For example, referring to the FIG. 1B, the failure and success transitions of the basic goto-failure graph 100B may be modified to create the limited expansion state graph 600A of FIG. 6A, as described above with respect to FIGS. 5A-5D. Then, for this example, the states of the limited expansion graph 600A are path compressed in the manner described above with respect to FIGS. 7A-7B to create a path-compressed state graph 1100A that achieves a success-size parameter S=2. More specifically, starting at the root node S0 of state graph 600A, states S1 and S2 are compressed into state S2 which is reached by the 2-character success transition "ra" from S0 (e.g., and where S2 represents the matching prefix "ra"), states S3 and S4 are compressed into state S4 which is reached by the 2-character success transition "in" from S2 (e.g., where S4 represents the matching prefix "rain"), and so on, as depicted in FIG. 11A (step 704a). In this manner, a string search engine operating according to the path-compressed state graph 1100A of FIG. 11A may process up to S=2 characters per search cycle. For example, if the first two input characters detected at S0 are "ra," then the search engine transitions to S2 via the "ra" success transition. Then, if the next two input characters are "in," then the string search engine transitions to S4 via the "in" success transition.

Figure 11B:
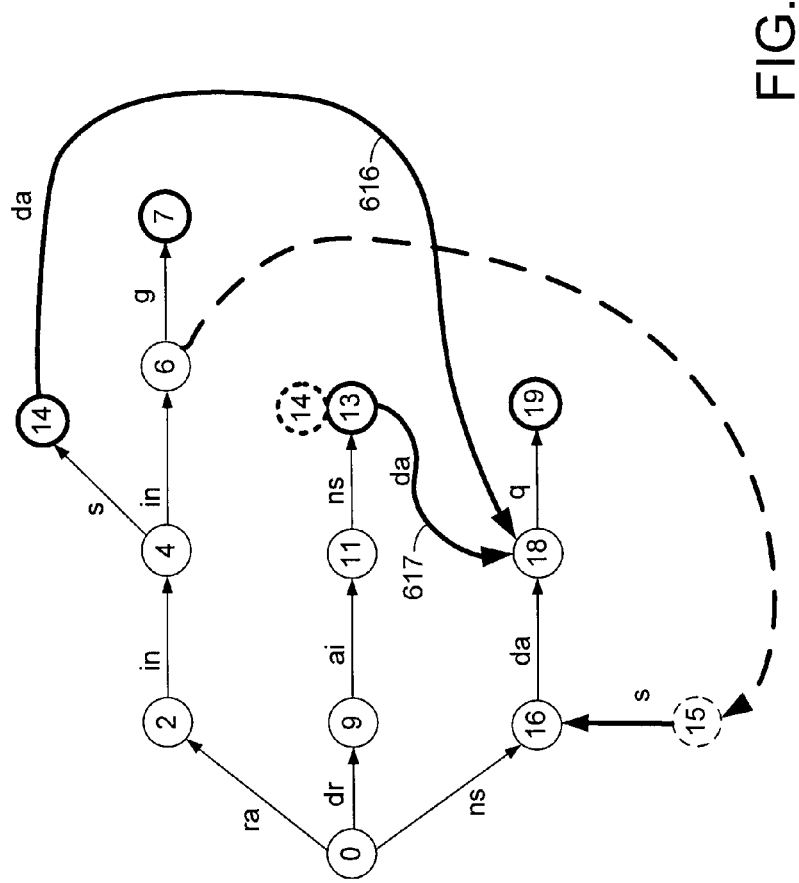
FIG. 11B shows additional modifications to the search tree of FIG. 11A that further increase the success size parameter of the search tree in accordance with the present invention.

Then, the fail states of the core states of the path-compressed state graph that were eliminated during the path-compression operation of step 704a are restored (step 704b). For this example, state S15, which is the fail state of core state S6, is restored to form a modified path-compressed state graph 1100B, as shown in FIG. 11B. The restored fail state S15 is shown as a dashed circle in FIG. 11B. Note that the fail states of other states that were eliminated during path compression are not restored because their source states are not present in the path-compressed search tree. For example, state S2, which is the fail state of state S10, is not restored because 510 does not exist in the path-compressed state graph 1100A of FIG. 11A.

Next, failure transitions from the core states of the path-compressed state graph to their restored fail states are inserted (step 704c). For this example, the failure transition from core state S6 to restored state S15 is restored, as shown by the bold dashed line in FIG. 11B.

Then, a success transition having up to S=2 characters is inserted from each restored fail state to the nearest core state (step 704d). For this example, a 1-character success transition "s" is inserted between restored fail state S15 and core state S16.

Then, cross edges from the core states of the path-compressed state graph to states that were eliminated during path compression are modified so that for each such core state a cross edge exists to another core state (step 704e). For this example, referring also to FIG. 6A, there is a "d" cross edge 614 from core state S13 to S17, which is eliminated during path compression. Because core state S18 is reached from the eliminated state S17 via an "a" success transition, the "d" cross edge from S14 to S17 is modified to become a "da" cross edge 616 from core state S14 to core state S18, as shown by the bold line in FIG. 11B. In a similar manner, the "d" cross edge 614 from S13 to eliminated state S17 is replaced by a "da" cross edge 617 from core state S13 to core state S18.

Note the similarity between the resulting state graphs of FIGS. 10C and 11B, which indicates that the order in which the state graphs are modified to optimize the F and S parameter values may be arbitrary (e.g., at least for some signature definitions).

As mentioned above, search operations implemented according to search trees created in accordance with processing speed optimization operations of the present invention may be performed by any suitable string search engine, including SRAM-based string search engines and TCAM-based search engines. When using an SRAM-based string search engine such as engine 300 of FIG. 3A to perform search operations in which multiple input characters are processed at a time (e.g., such as the S=2 search trees of FIGS. 10A-10C and 11A-11B), the resulting expanded state entries that implement the search tree may each require a large number (e.g., hundreds or more) of independently-addressed storage locations for state memory 320, which in turn may undesirably require a corresponding number of memory accesses to state memory 320 for each edge compare operation. Thus, the SRAM-based search engine may employ well-known hashing techniques to reduce the number of memory accesses required for each edge compare operation, thereby increasing overall processing speed. For example, during each edge compare operation, the current state value (SID) and S characters of the input are concatenated using a suitable hashing function to form a hash key. The hash key is then used to address a storage location in the state memory (SRAM) that contains a corresponding portion of the state entry for the next state in the search tree. As known in the art, the state information portions for any given state of the search tree may be stored in non-contiguous locations of the state memory.

For one example, at the root node of any of the S=2 search trees described herein (e.g., state graphs 800A, 800B, 1000A, 1000B, 1100A and/or 1100B), if the first 2 characters of the input string are "ra," then the state value SID=00 may be concatenated with "ra" to form a hash key HK="00ra." The hash key is then hashed (e.g., using an appropriate hashing function) to generate an index I1 that points to the portion of the next state information corresponding to the matching edge "ra" (which for this example identifies state S2 as the next state because the success transition "ra" leads from state S0 to S2). For another example, if the first 2 characters of the input string are "dr" when the string search engine is at the root node S0, then the state value SID=00 may be concatenated with "dr" to form a hash key HK="00dr." The hash key is then hashed (e.g., using an appropriate hashing function) to generate an index I2 that points to the portion of the next state information corresponding to the matching edge "dr" (which for this example identifies state S9 as the next state because the success transition "dr" leads from state S0 to S9). In this manner, the hashing function performs the look-up function to determine the next state, which is accessed from a location generated by the hashing function rather than by reading the next state from the current state entry's matching success field.

As known in the art, a TCAM-based search engine may be used to eliminate multiple memory accesses at each state of the search tree (e.g., as may be required for SRAM-based search engines of the type shown in FIG. 3A) because a TCAM can simultaneously search all the state entries that embody a particular signature definition. Thus, NSS bitmaps are not required to implement iterative compare operations with decreasing number of input characters when a TCAM is employed as the FSM.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for selectively performing iterative compare operations between a plurality of overlapping substrings of an input string of characters and a number of success transitions at a current state of a search tree using a state machine, comprising:
   accessing a bitmap associated with the current state, the bitmap comprising first and second next search size (NSS) bits, wherein the first NSS bit indicates whether a first substring including a first number of input characters is to be compared with the success transitions in a first compare operation, and wherein the second NSS bit indicates whether a second substring including a second number of input characters is to be compared with the success transitions in a second compare operation, wherein the first number of input characters is different than the second number of input characters;
   performing the first compare operation only if the first NSS bit is asserted to selectively take a first success transition; and
   performing the second compare operation only if the second NSS bit is asserted and either the first NSS bit is de-asserted or the first compare operation results in a mismatch to selectively take a second success transition.

2. The method of claim 1, wherein the second substring consists of a subset of the first substring.

3. The method of claim 1, wherein a bit position of each NSS bit in the bitmap indicates how many of the input characters are included in the corresponding substring.

4. The method of claim 1, further comprising:
   performing none of the compare operations if all the NSS bits are de-asserted.

5. The method of claim 1, further comprising:
   transitioning to a first next state of the search tree if the first compare operation results in a match; and
   transitioning to a second next state of the search tree if the second compare operation results in a match.

6. The method of claim 1, further comprising:
   storing the bitmap in a state entry associated with the state.

7. The method of claim 1, wherein the first and second substrings are extracted from the input string without modification.

8. A method for selectively performing iterative compare operations between a searchable pattern and S overlapping substrings of an input string of characters using a state machine having a plurality of states, wherein all the substrings include at least one common input character, comprising:
   providing a bitmap having S next search size (NSS) bits, wherein each NSS bit indicates whether an associated substring that includes a corresponding unique number of the input characters is to be compared with the searchable pattern in successive compare operations at a current state of the state machine; and
   selectively performing the successive compare operations at the current state in response to the NSS bits to determine whether to transition to a next state of the state machine.

9. The method of claim 8, wherein the selectively performing further comprises:
   performing none of the compare operations if all the NSS bits are de-asserted.

10. The method of claim 8, wherein the first and second substrings are extracted from the input string without modification.

11. The method of claim 8, wherein a bit position of each NSS bit in the bitmap indicates how many of the input characters are included in the corresponding substring.

12. The method of claim 8, wherein the selectively performing comprises:
   selectively comparing the searchable pattern and a first of the substrings in a first compare operation in response to a first NSS bit; and
   selectively comparing the searchable pattern and a second of the substrings in a second compare operation in response to a second NSS bit and in response to match results from the first compare operation.

13. The method of claim 12, wherein the first substring includes a first number of the input characters and the second substring includes a second number of the input characters, wherein the first number is greater than the second number.

14. The method of claim 12, wherein the second substring consists of a subset of the first substring.

15. The method of claim 12, wherein the first compare operation is performed only if the first NSS bit is asserted.

16. The method of claim 15, wherein the second compare operation is performed if the second NSS bit is asserted and the first compare operation results in a mismatch.

17. The method of claim 15, wherein the second compare operation is performed if the second NSS bit is asserted and the first NSS bit is de-asserted.

18. The method of claim 8, wherein the searchable pattern is embodied by a search tree.

19. A search engine to selectively perform iterative compare operations between a searchable pattern embodied by a search tree having a plurality of states and S overlapping substrings of an input string of characters, wherein all the substrings include at least one common input character, comprising:
   a memory to store a bitmap for each state, the bitmap having S next search size (NSS) bits, wherein each NSS bit indicates whether an associated substring including a corresponding unique number of the input characters is to be compared with the searchable pattern in successive compare operations at the corresponding state of the search tree; and
   a compare circuit to selectively perform the successive compare operations at the corresponding state of the search tree in response to the NSS bits to generate match results.

20. The search engine of claim 19, wherein the compare circuit does not perform any of the compare operations if all the NSS bits are de-asserted.

21. The search engine of claim 19, wherein the first and second substrings are extracted from the input string without modification.

22. The search engine of claim 19, wherein a bit position of each NSS bit in the bitmap indicates how many of the input characters are included in the corresponding substring.

23. The search engine of claim 19, wherein a first NSS bit indicates whether a first substring is to be compared with the searchable pattern in a first compare operation, and a second NSS bit indicates whether a second substring is to be compared with the searchable pattern in a second compare operation, wherein the second substring consists of a subset of the first substring.

24. The search engine of claim 23, wherein the compare circuit performs the first compare operation only if the first NSS bit is asserted.

25. The search engine of claim 24, wherein the compare circuit performs the second compare operation if the second NSS bit is asserted and the first compare operation results in a mismatch.

26. The search engine of claim 24, wherein the compare circuit performs the second compare operation if the second NSS bit is asserted and the first NSS bit is de-asserted.

27. A finite state machine (FSM) implementing a search tree that embodies a plurality of signatures to be compared with an input string of characters to generate an output match condition, the search tree including a number of branches of sequential states originating at a root node, wherein each state is associated with a state entry comprising:
  one or more success transitions, each success transition pointing to a corresponding next state;
  a failure transition pointing to a fail state; and
  a plurality of next search size (NSS) bits, wherein the NSS bits indicate whether corresponding ones of a plurality of overlapping substrings of the input string are to be compared with the success transitions associated with the corresponding state of the search tree during successive compare operations at the corresponding state to selectively take one of the success transitions or the failure transition, and to generate an output match condition.

28. The FSM of claim 27, further comprising:
  a bitmap having a number of entries, each for storing the NSS bits for a corresponding state.

29. The FSM of claim 28, wherein a bit position of each NSS bit in the bitmap indicates how many of the input characters are included in the corresponding substring.

30. The FSM of claim 27, wherein each of the substrings includes a unique number of the input characters.

31. The FSM of claim 27, wherein a first NSS bit indicates whether a first substring is to be compared with the searchable pattern in a first compare operation, and a second NSS bit indicates whether a second substring is to be compared with the searchable pattern in a second compare operation, wherein the second substring consists of a subset of the first substring.

32. The FSM of claim 31, wherein the first compare operation is performed only if the first NSS bit is asserted.

33. The FSM of claim 32, wherein the second compare operation is performed if the second NSS bit is asserted and the first compare operation results in a mismatch.

34. The FSM of claim 32, wherein the second compare operation is performed if the second NSS bit is asserted and the first NSS bit is de-asserted.

35. The FSM of claim 31, wherein none of the compare operations are performed if all the NSS bits are de-asserted.

36. A search engine to selectively perform iterative compare operations between a plurality of overlapping substrings of an input string of characters and a number of success transitions at a current state of a search tree, comprising:
  means for accessing a bitmap associated with the current state, the bitmap comprising first and second next search size (NSS) bits, wherein the first NSS bit indicates whether a first substring including a first number of input characters is to be compared with the success transitions in a first compare operation at the current state, and wherein the second NSS bit indicates whether a second substring including a second number of input characters is to be compared with the success transitions in a second compare operation at the current state, wherein the first number of input characters is different than the second number of input characters;
  means for performing the first compare operation only if the first NSS bit is asserted; and
  means for performing the second compare operation only if the second NSS bit is asserted and either the first NSS bit is de-asserted or the first compare operation results in a mismatch.

37. The search engine of claim 36, wherein the second substring consists of a subset of the first substring.

38. The search engine of claim 36, wherein a bit position of each NSS bit in the bitmap indicates how many of the input characters are included in the corresponding substring.

39. The search engine of claim 36, wherein none of the compare operations are performed if all the NSS bits are de-asserted.

40. The search engine of claim 36, further comprising:
  means for transitioning to a first next state of the search tree if the first compare operation results in a match; and
  means for transitioning to a second next state of the search tree if the second compare operation results in a match.

* * * * *